US008485055B2

(12) United States Patent
Gumpoltsberger et al.

(10) Patent No.: US 8,485,055 B2
(45) Date of Patent: Jul. 16, 2013

(54) DOUBLE CLUTCH WINDING TRANSMISSION

(75) Inventors: Gerhard Gumpoltsberger, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1050 days.

(21) Appl. No.: 12/515,238

(22) PCT Filed: Nov. 5, 2007

(86) PCT No.: PCT/EP2007/061846
§ 371 (c)(1),
(2), (4) Date: May 15, 2009

(87) PCT Pub. No.: WO2008/058858
PCT Pub. Date: May 22, 2008

(65) Prior Publication Data
US 2011/0030488 A1 Feb. 10, 2011

(30) Foreign Application Priority Data

Nov. 17, 2006 (DE) .......................... 10 2006 054 281

(51) Int. Cl.
*F16H 3/08* (2006.01)
(52) U.S. Cl.
USPC ............................................................ 74/330
(58) Field of Classification Search
USPC ................................ 74/329, 330, 331, 335, 340
See application file for complete search history.

(56) References Cited

U.S. PATENT DOCUMENTS

| | | | | |
|---|---|---|---|---|
| 4,658,663 A | * | 4/1987 | Hiraiwa | 74/359 |
| 5,125,282 A | * | 6/1992 | Bender et al. | 74/359 |
| 5,592,854 A | | 1/1997 | Alfredsson | |
| 6,958,028 B2 | | 10/2005 | Janson et al. | |
| 7,225,695 B2 | * | 6/2007 | Gumpoltsberger et al. | 74/325 |

(Continued)

FOREIGN PATENT DOCUMENTS

| | | | |
|---|---|---|---|
| DE | 3152696 A1 | * | 6/1983 |
| DE | 3715880 | | 5/1988 |

(Continued)

OTHER PUBLICATIONS

Franki R, Das Automatische Doppelkupplungsgetriebe Fuer Sechs Oder Acht Lastfrei, Ohne Antriebsunterbrechung, Und Ohne Verspannung Schaltbare Gaenge, ATZ Automobiltechnische Zeitschrift, May 5, 1999, Vieweg Publishing, Wiesbaden, DE.

(Continued)

*Primary Examiner* — Troy Chambers
*Assistant Examiner* — Michael Gonzalez
(74) *Attorney, Agent, or Firm* — Davis & Bujold P.L.L.C.

(57) ABSTRACT

A double clutch winding transmission, having two sub-transmissions (T1, T2), coaxial transmission input shafts (1, 19), which are each coupled to a clutch (K1, K2), at least one counter shaft (2, 22) and a transmission output shaft (15) that is coaxially aligned with the transmission input shaft (1, 19). In at least one gear shift position, the flow of energy (L1 to L8) in the transmission winds through at least two meshing gear wheels (3 to 14), forming gear wheel levels (Z1 to Z6). The two sub-transmissions (T1, T2) are configured as two, consecutively positioned, single winding transmissions (W1, W2), each having at least four forward gear positions.

29 Claims, 22 Drawing Sheets

U.S. PATENT DOCUMENTS

| | | | |
|---|---|---|---|
| 7,231,843 B2 * | 6/2007 | Gumpoltsberger et al. | 74/329 |
| 7,267,022 B2 * | 9/2007 | Gumpoltsberger et al. | 74/331 |
| 7,272,985 B2 * | 9/2007 | Gumpoltsberger et al. | 74/331 |
| 7,287,442 B2 * | 10/2007 | Gumpoltsberger | 74/331 |
| 7,329,205 B2 * | 2/2008 | Preisner et al. | 477/80 |
| 7,500,411 B2 | 3/2009 | Gumpoltsberger | |
| 2002/0033059 A1 | 3/2002 | Pels et al. | |
| 2002/0177504 A1 | 11/2002 | Pels et al. | |
| 2004/0093972 A1 | 5/2004 | Gumpoltsberger et al. | |
| 2005/0130795 A1 | 6/2005 | Kim et al. | |
| 2005/0204839 A1 | 9/2005 | Soeda | |
| 2005/0247147 A1 * | 11/2005 | Gumpoltsberger et al. | 74/325 |
| 2006/0048593 A1 * | 3/2006 | Gumpoltsberger et al. | 74/325 |
| 2006/0122031 A1 * | 6/2006 | Preisner et al. | 477/80 |
| 2007/0214904 A1 * | 9/2007 | Ohnemus | 74/330 |
| 2007/0220999 A1 * | 9/2007 | Hatori et al. | 74/330 |
| 2007/0227285 A1 * | 10/2007 | Drabek | 74/340 |
| 2008/0006109 A1 | 1/2008 | Nicklass | |
| 2009/0095101 A1 | 4/2009 | Gitt | |

FOREIGN PATENT DOCUMENTS

| | | |
|---|---|---|
| DE | 10343995 | 5/2005 |
| GB | 2103316 | 2/1983 |
| GB | 2103317 A * | 2/1983 |
| GB | 2412148 | 9/2005 |
| JP | 58124851 A | 7/1983 |
| JP | 4083953 A | 3/1992 |
| JP | 2002089594 A | 3/2002 |
| JP | 2002362197 A | 12/2002 |
| JP | 2003120764 A | 4/2003 |
| JP | 2004168295 A | 6/2004 |
| JP | 2005172220 A | 6/2005 |
| JP | 2005265139 A | 9/2005 |
| JP | 2005329813 A | 12/2005 |
| JP | 2008528893 A | 7/2008 |
| WO | 9407055 | 3/1994 |
| WO | 2006084555 | 8/2006 |
| WO | 2007115687 | 10/2007 |

OTHER PUBLICATIONS

Tenberge P, Double-Clutch Transmission-Power-Shiftable Winding Transmission Mar. 13, 2002, VDI Berichte, Dusseldork, DE.

Japanese Office Action dated Oct. 30, 2012.

* cited by examiner

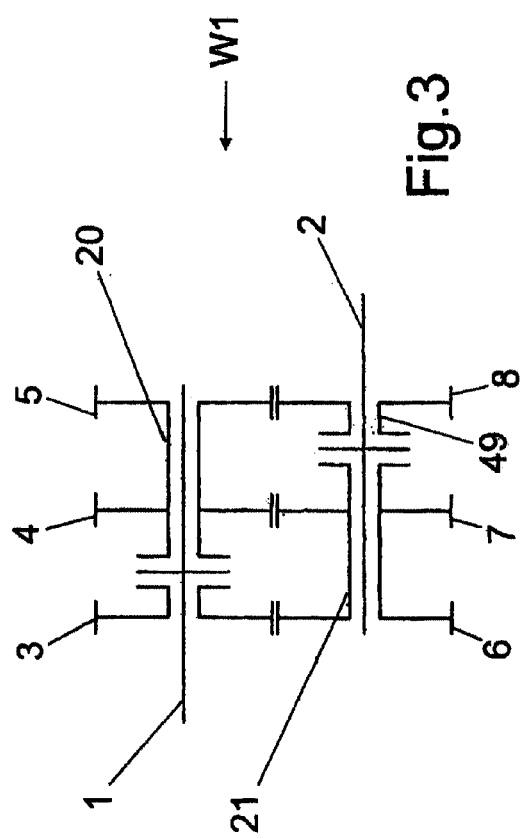
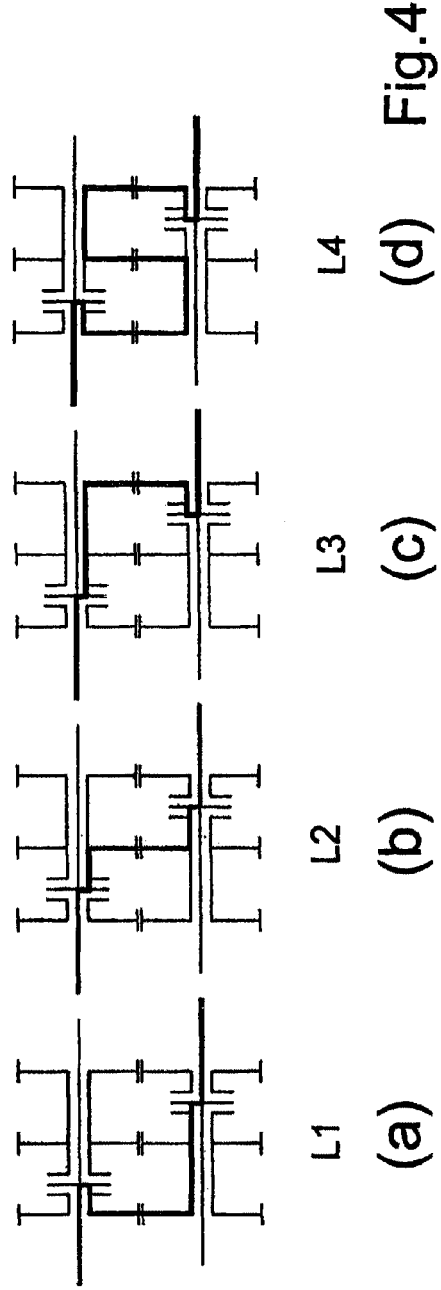

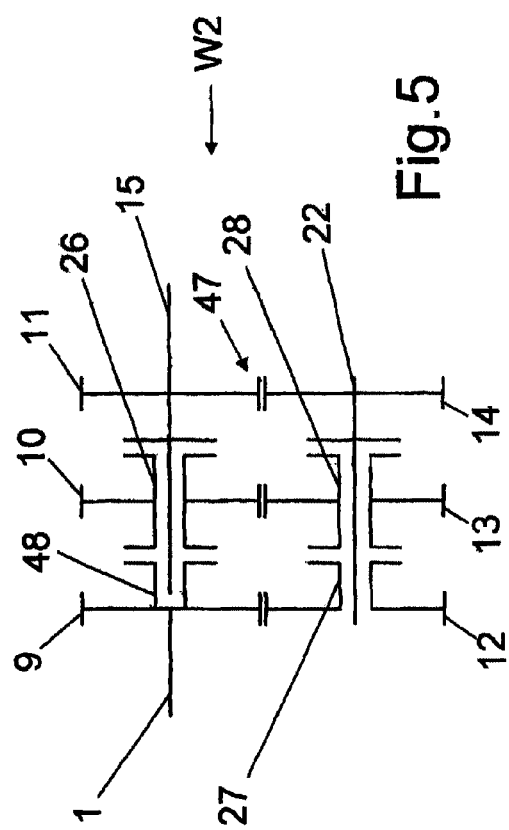

| 6D | K1 | K2 | A | B | C | D | E | F | G | H | i | φ |
|---|---|---|---|---|---|---|---|---|---|---|---|---|
| 1. Gang | • | | • | | | • | | | | | 4,40 | 1,44 |
| 2. Gang | | • | | | | | | • | • | | 3,07 | 1,26 |
| 3. Gang | • | | • | | | • | | | | | 2,43 | 1,33 |
| 4. Gang | | • | | | | | | • | | • | 1,82 | 1,35 |
| 5. Gang | • | | | • | | • | | | | | 1,35 | 1,35 |
| 6. Gang | | • | | | | | • | | • | | 1,00 | 1,34 |
| 7. Gang | • | | | • | • | | | | | | 0,75 | 1,25 |
| 8. Gang | | • | | | | | • | | | • | 0,59 | 7,40 |

Fig.10

| 6D | K1 | K2 | A | B | C | D | E | F | G | H | i | φ |
|---|---|---|---|---|---|---|---|---|---|---|---|---|
| 1. Gang | • | | • | | | • | | | | | 4,40 | 1,44 |
| 2. Gang | | • | | | | | | • | • | | 3,07 | 1,26 |
| 3. Gang | • | | • | | | • | | | | | 2,43 | 1,33 |
| 4. Gang | | • | | | | | | • | | • | 1,82 | 1,35 |
| 5. Gang | • | | • | | • | | | | | | 1,35 | 1,35 |
| 6. Gang | | • | | | | | • | | • | | 1,00 | 1,34 |
| 7. Gang | • | | | • | • | | | | | | 0,75 | 1,25 |
| 8. Gang | | • | | | | | • | | | • | 0,59 | 7,40 |

Fig.11

| 7D | K1 | K2 | A | B | C | D | E | F | G | H | i | φ |
|---|---|---|---|---|---|---|---|---|---|---|---|---|
| 1. Gang |  | • |  |  |  |  |  | • |  | • | 5,42 | 1,42 |
| 2. Gang | • |  | • |  |  | • |  |  |  |  | 3,82 | 1,24 |
| 3. Gang |  | • |  |  |  |  |  | • | • |  | 3,07 | 1,34 |
| 4. Gang | • |  | • |  | • |  |  |  |  |  | 2,30 | 1,30 |
| 5. Gang |  | • |  |  |  |  | • |  |  | • | 1,76 | 1,35 |
| 6. Gang | • |  |  | • |  | • |  |  |  |  | 1,31 | 1,31 |
| 7. Gang |  | • |  |  |  |  | • |  | • |  | 1,00 | 1,27 |
| 8. Gang | • |  |  | • | • |  |  |  |  |  | 0,79 | 6,86 |

Fig.12

| 7D | K1 | K2 | A | B | C | D | E | F | G | H | i | φ |
|---|---|---|---|---|---|---|---|---|---|---|---|---|
| 1. Gang |  | • |  |  |  |  |  | • |  | • | 5,42 | 1,42 |
| 2. Gang | • |  | • |  |  | • |  |  |  |  | 3,82 | 1,24 |
| 3. Gang |  | • |  |  |  |  | • |  |  | • | 3,07 | 1,34 |
| 4. Gang | • |  | • |  | • |  |  |  |  |  | 2,30 | 1,30 |
| 5. Gang |  | • |  |  |  |  |  | • | • |  | 1,76 | 1,35 |
| 6. Gang | • |  |  | • |  | • |  |  |  |  | 1,31 | 1,31 |
| 7. Gang |  | • |  |  |  |  | • |  | • |  | 1,00 | 1,27 |
| 8. Gang | • |  |  | • | • |  |  |  |  |  | 0,79 | 6,86 |

Fig.13

| 7D | K1 | K2 | A | B | C | D | E | F | G | H | i | φ |
|---|---|---|---|---|---|---|---|---|---|---|---|---|
| 1. Gang |  | • |  |  |  |  |  | • |  | • | 5,42 | 1,42 |
| 2. Gang | • |  | • |  |  | • |  |  |  |  | 3,82 | 1,24 |
| 3. Gang |  | • |  |  |  |  |  | • | • |  | 3,07 | 1,34 |
| 4. Gang | • |  |  | • |  | • |  |  |  |  | 2,30 | 1,30 |
| 5. Gang |  | • |  |  |  |  | • |  |  | • | 1,76 | 1,35 |
| 6. Gang | • |  | • |  | • |  |  |  |  |  | 1,31 | 1,31 |
| 7. Gang |  | • |  |  |  |  |  | • |  | • | 1,00 | 1,27 |
| 8. Gang | • |  |  | • | • |  |  |  |  |  | 0,79 | 6,86 |

Fig.14

| 7D | K1 | K2 | A | B | C | D | E | F | G | H | i | φ |
|---|---|---|---|---|---|---|---|---|---|---|---|---|
| 1. Gang |  | • |  |  |  |  |  | • |  | • | 5,42 | 1,42 |
| 2. Gang | • |  | • |  |  | • |  |  |  |  | 3,82 | 1,24 |
| 3. Gang |  | • |  |  |  |  | • |  |  | • | 3,07 | 1,34 |
| 4. Gang | • |  |  | • |  | • |  |  |  |  | 2,30 | 1,30 |
| 5. Gang |  | • |  |  |  |  |  | • | • |  | 1,76 | 1,35 |
| 6. Gang | • |  | • |  | • |  |  |  |  |  | 1,31 | 1,31 |
| 7. Gang |  | • |  |  |  |  |  | • | • |  | 1,00 | 1,27 |
| 8. Gang | • |  |  | • | • |  |  |  |  |  | 0,79 | 6,86 |

Fig.15

| 8D | K1 | K2 | A | B | C | D | E | F | G | H | i | φ |
|---|---|---|---|---|---|---|---|---|---|---|---|---|
| 1. Gang | • |   | • |   |   | • |   |   |   |   | 6,63 | 1,42 |
| 2. Gang |   | • |   |   |   |   |   | • |   | • | 4,66 | 1,25 |
| 3. Gang | • |   | • |   | • |   |   |   |   |   | 3,73 | 1,30 |
| 4. Gang |   | • |   |   |   |   | • |   |   | • | 2,86 | 1,32 |
| 5. Gang | • |   |   | • |   | • |   |   |   |   | 2,17 | 1,34 |
| 6. Gang |   | • |   |   |   |   |   | • | • |   | 1,63 | 1,33 |
| 7. Gang | • |   |   | • | • |   |   |   |   |   | 1,22 | 1,22 |
| 8. Gang |   | • |   |   |   |   | • |   | • |   | 1,00 | 6,63 |

Fig.16

| 8D | K1 | K2 | A | B | C | D | E | F | G | H | i | φ |
|---|---|---|---|---|---|---|---|---|---|---|---|---|
| 1. Gang | • |   | • |   |   | • |   |   |   |   | 6,63 | 1,42 |
| 2. Gang |   | • |   |   |   |   |   | • |   | • | 4,66 | 1,25 |
| 3. Gang | • |   |   |   | • | • |   |   |   |   | 3,73 | 1,30 |
| 4. Gang |   | • |   |   |   |   | • |   |   | • | 2,86 | 1,32 |
| 5. Gang | • |   |   | • | • |   |   |   |   |   | 2,17 | 1,34 |
| 6. Gang |   | • |   |   | • |   |   | • | • |   | 1,63 | 1,33 |
| 7. Gang | • |   |   |   | • | • |   |   |   |   | 1,22 | 1,22 |
| 8. Gang |   | • |   |   |   |   | • |   | • |   | 1,00 | 6,63 |

DOUBLE CLUTCH WINDING TRANSMISSION

This application is a National Stage completion of PCT/EP2007/061846 filed Nov. 5, 2007, which claims priority from German patent application serial no. 10 2006 054 281.9 filed Nov. 17, 2006.

FIELD OF THE INVENTION

The invention describes a Double Clutch Winding Transmission.

BACKGROUND OF THE INVENTION

Double clutch transmissions have already been in use in motor vehicles in gearbox transmissions, mainly in automatic transmission systems. They possess the distinction of operating under a nearly pull force free condition when shifting the gear position. Herewith, the accomplishments are more comfortable and fewer load changes during shifting, allowing at the same time a simultaneously, improved acceleration of the vehicle. A frequently used standard construction method utilizing coaxial drive shafts and their function is explained, for instance, in the DE 198 21 164 A1.

Therein, two clutches which are located at the driving end and are for instance wet running plate clutches, in each case these are linked together by means of a transmission's input shaft with a sub-transmission formed as an intermediate transmission, whereby one of the sub-transmissions encompasses the even numbered forward gear positions, and the other sub-transmission encompasses the odd numbered forward gear positions. One or more reverse gear positions can be arranged on either side, depending on the amount of the gear positions.

The two clutches are constructed as an interlaced double clutch, whereby the two transmissions input shafts are arranged in a coaxial formation with each other. One input transmission shaft is in this case constructed as a shorter hollow shaft, bearing concentrically the other transmissions input shaft which is constructed as a central shaft or solid shaft and extends from the hollow shaft in an area opposite of the clutches.

Such transmission's shift operation takes place sequentially, whereby in each case a next following shift position is being preselected by the currently non-transmitting sub-transmission, so that two shift positions are being engaged simultaneously and, through overlaying disengagement or engagement of the two clutches, the shift changes can proceed from the current shift position to the next, targeted shift position, practically without interrupting the vehicle's drive condition.

In general, gear and shift transmissions for vehicles are being increasingly manufactured with a higher amount of gear positions, to increase the efficiency and to make better use of the combustion engine's potential, whereby, at the same time, an attempt is made to reduce the emission of unwanted pollutants. By now, six-position transmissions in passenger cars are quite commonly used. Also, seven-position transmissions are known as conventional transmissions having a clutch, an example can be found in the patent filing DE 103 05 242 A1, and also already known as a double clutch system with two clutches, as shown in the patent filing DE 103 05 241 A1.

Generally, the motor vehicle's transmission with up to seven forward gear positions will be designed as a single-group transmission. While multi-stage automatic transmissions can also be designed with planetary configurations having more than seven gear positions, as described in the patent filing DE 10 2004 041 507 A1, transmissions with even larger gear positions are most likely being designed and constructed with multiple-group configurations. The presently available multiple-group transmissions are predominantly provided for commercial utility vehicles. Hereby, a typical use, for up to 16 forward gear positions, is generally a two-group configuration with one main-group and a following range group, additionally known is a three-group configuration with a preceding split-group.

A multi-group design is also already known in double clutch transmissions. A double clutch system is been described in DE 102 32 831 A1, where the two sub-transmissions in each case include two group transmissions, establishing a 2×2×3 intermediate gear transmission representing a total of 12 forward gear positions.

Furthermore, the winding transmissions are known in the art. The flow of the energy, when shifting between one or more gears in winding transmissions, proceeds through several gear stages, between one main shaft and a parallel counter shaft or counter shaft, respectively. In other words, the flow of energy is "winding" itself through the transmission. A general description of the particular transmissions can be found in G. Lechner, N. Naunheimer: "Fahrzeuggetriebe, Grundlagen, Auswahl, Auslegung and Konstruktion.", Springer Verlag, Berlin, Heidelberg, 1991. Winding transmissions, as compared to conventional transmission, have the advantage of using fewer gear pairs, can be constructed relatively compact, and can therefore also be considered in the manufacturing of transmission with a relatively high gear count, so called high gear count transmissions. In addition, they can be easily controlled through shorter shift intervals, as compared to multi-group transmissions. In principle, all gears of a winding transmission can be switched and are allocated to their own shafts and rotatable mounted on shafts, respectively, resulting in "r" gear stages and a number of gears equal to $z=2^{r-1}$. This means that, by using the three gear stages, a four gear transmission can be realized and therefore, compared to a conventional four gear transmission, one gear stage can be spared.

A combination of a group transmission together with a winding transmission is known in the art through DE 101 37 356 A1. In the publication, a two group intermediate transmission is described, with a main group in a winding construction and a preceding section group. The main group comprises three gear sets which are used as the forward gears, as well as a conversion wheel set for the reverse gear. The section group shows two additional gear sets needed for the forward gears. The first gear set in the main transmission is positioned on a drive shaft. The two following gear sets are positioned on a counter shaft, which can be connected through shift clutches on one side with the drive shaft and on the other hand with the section transmission's output shaft. The intermediate gear shaft is separated within the main transmission also at a proper location through a shift clutch. Thereby, different shift combinations can occur, where the flow of energy flows through several gear stages. The first four gear positions, generated by the main winding transmission, are guided through the section transmission's first gear set to the drive shaft, four additional shift positions are accomplished through the section transmission's second gear set. In addition, a $9^{th}$ gear is available as direct gear, in which the output shaft is coupled with the drive shaft through the counter shaft.

The application of a winding construction in a double clutch transmission is known in itself through DE 103 39 758

A1. The two sub-transmissions are arranged as interlaced units. The double clutch is designed in a conventional construction and is connected on the output side with the outer hollow shaft, as well as with the inner solid shaft. The hollow shaft, through a first input constant, produces in the first sub-transmission the odd gears one, three, five, and seven, as well as two (odd) reverse gears. The solid shaft, through a second input constant, produces gear two, four, and six, as well as an additional (even) reverse gear position.

To generate a direct gear, for example the sixth gear, the solid shaft can be coupled through a first shift clutch with a coaxial drive shaft. The first shift clutch serves for operating two gear sets. A second shift clutch activates a reverse wheel set, but is also, in the direction of the transmission's output, connected to a hollow shaft which contains and additional solid shaft, the hollow shaft carries two gears, where one is switchable through the second shift clutch and the other being switchable through a fourth shift clutch, located opposite on the counter shaft of the first sub-transmission.

Comparable to the transmission input shaft's configuration, the counter shafts of the sub-transmissions are also designed with an outer hollow shaft which contains the inner solid shaft, penetrating the hollow shaft but, in this case, the hollow shaft is assigned to the second sub-transmission and the solid shaft is assigned to the first sub-transmission. The link between the transmission's input shafts and the related counter shafts is achieved through respective input constants. At the end of the transmission's output of the outer, hollow counter shaft, here the second sub-transmission, a third shift clutch is connected, which can selectively connects a gear of the second sub-transmission with the outer counter shaft or it connects the outer counter shaft with the inner counter shaft, meaning the first sub-transmission.

Because of the sub-transmissions' interlaced structure and through a corresponding shift logic, a flow of energy is established for the different gears, which proceeds parallel in the sub-transmissions and in partial sections axial, from the output back towards the input, to be finally re-routed again after several windings towards the output direction. Overall, the known configuration presents a relatively compact double clutch transmission with seven forward gear and three reverse gear positions, which are switchable by a total of four shift clutches.

The focus of DE 103 39 758 A1 is towards establishing a double clutch transmission with several, for instance one even and two odd reverse gear positions, which is especially advantageous to utility vehicles. Hereby, drivel-force-interrupted is perceived when shifting between the reverse gears and/or between forward and reverse gears. The preferred amount of forward gears is an odd number. Because the first gear and the highest gear, under conditions of odd number shift positions, belong to the same sub-transmission, a relatively short first gear can be established through the support of a winding first gear, therefore accomplishing a high input gear transmission ratio which is required for utility vehicles and at the same time offering an adequate, high gear ratio spread for the largest gear.

Disadvantageously, however, with this described transmission structure at least one gear wheel pair can be saved with the conventional intermediate transmission. An increase to a higher number of gear positions than seven is not readily feasible, because of a complicated and elaborate construction and also a complicated flow of energy. A person skilled in the art will not find any hints in it, regarding the realization of a double clutch transmission with more than seven gear positions in the way of winding construction.

SUMMARY OF THE INVENTION

Based on the background, this invention's objective is to create a compact configured double clutch transmission of winding construction, and with more than seven gears, which is simple in the architecture and at the same time cost-effective.

The invention is based on the insight that a winding transmission's basic construction and basic design, comprising gearwheels which are individually switchable and located on a main shaft and a counter shaft, through an adequate combination of at least two modified basic transmissions and each having a relatively low number of gears, can serve as basis to construct a simple multi-gear double clutch system in a winding design.

The invention assumes a double clutch winding transmission comprising two sub-transmissions with transmission input shafts that are coaxially positioned with one another and which are each linked via a clutch, with at least one counter shaft and with a transmission's output shaft which is positioned coaxial with a transmission's input shafts, whereby the flow of energy of at least one gear winds itself through minimally two engaged gear wheels, having established a gear wheel stage. The invention also indicates, when solving the transmission's task, that the two sub-transmissions are designed as two consecutive, single winding transmissions, with at least four forward gears each.

Hereafter, the terms are being used such as "left" for "driving end", and close to the clutch, and "right" for "output end", meaning the far side of the double clutch. Accordingly, the sub-transmission on the motor's drive side is also being called the left sub-transmission and the sub-transmission on the output side also being called the right sub-transmission. In addition, terms such as "top" and "bottom" are being used, whereby the definition for top addresses the position of being aligned with a drive shaft and bottom being the position aligned with the intermediate axial shaft. A multi-part hollow shaft is being understood as several multi-part, independently rotatable mounted hollow shafts or hollow shaft segments.

Through the arrangement of two, consecutively positioned winding transmissions, where each represents a sub-transmission with a gear group, an economically priced and easy to build double clutch transmission can be constructed, having more than seven forward gear positions, for instance having eight forward gear positions. The invention as such is especially advantageous for passenger cars with high torque and for utility vehicles.

A preferred configuration of the invention's transmission is the design of the first sub-transmission, positioned on the drive side, as a one stage, four gear winding transmission with parallel input and output as well as a second sub-transmission, positioned on the drive side and following the stage, designed as a two-stage, four gear winding transmission with a coaxial drive input and output.

Through these two four-gear winding transmissions, constructed in a simplified embodiment as sub-transmissions, utilizing the basic operation of single, shift able, and shaft mounted rotatable gear wheels, different eight-gear double clutch transmissions can be combined. Fundamentally, the invention's embodiment can also be extended to more than eight forward shift positions.

A particularly advantageous combination can be achieved by having the first winding sub-transmission, located on the motor's drive side, having a multi-part hollow shaft designed as transmission input shaft, from which transmission input shaft, designed as solid shaft of the second winding sub-transmission, then exits from it, also having a counter shaft designed as a drive shaft and multi-part hollow shaft, and the second winding sub-transmission is constructed as a multi-part hollow shaft, which is connected with the transmission input shaft, designed as solid shaft, and from which, on the output side, a transmission output shaft exits, and which comprises a counter shaft, designed as multi-part hollow shaft, whereby the latter is linked with the first sub-transmission's drive shaft.

Hereby, an exceptionally compact configuration can be constructed in a way that the first winding sub-transmission comprises three of the outer gear wheels, assigned to the hollow transmission input shaft, representing three gear wheel stages, whereby in each case, on the drive side and the intermediate gear side, two of the three gear wheels are linked solid in a mirror-image manner, and a shift cluster is being positioned between the two linked gear wheels and the third gear wheel.

It is also possible that the first winding transmission comprises three of the gear wheels, assigned to the outer, hollow transmission input shaft and also three gear wheels of the related counter shaft, which form three gear wheel stages, whereby the right gear wheel on the counter shaft at the double clutch's far end is designed as a fixed wheel and a shift cluster is being positioned between the gear wheels.

Furthermore, another version comprises a layout where the second winding sub-transmission can have three top gear wheels, aligned with the drive shaft, whereby one gear wheel, close to the double clutch, is connected in a rotationally fixed manner the inner transmission's input shaft, a mid-point gear wheel being designed as idle gear, and right gear wheel, positioned further distant from the double clutch, is connected with the transmission output shaft, and the second winding transmission is configured having three bottom gear wheels, aligned with the counter shaft, whereby the left gear wheel, close to the double clutch, and the center gear wheel are designed as idle gears, and the right gear wheel being designed as fixed gear, and that the meshing, opposing gear wheels are creating three additional gear wheel stages, where a shift cluster is being positioned between the gear wheels.

Therefore, the two described alternatives differ within the left sub-transmission, whereby the reason for major difference, in the first option, is the design method for gear shifting, or the involved shafts respectively, is a shift cluster concept, and in the second version a design concept of a single element configuration. Basically, the right sub-transmission's shifting clusters are always designed and positioned as single elements.

Thus, dual-sided and/or one-sided effective synchronization can be assigned to the shift positions, the so called half synchronization. Other clutch elements, for instance simple claw clutches, are also applicable.

The synchronization can be initiated advantageously from the outside through shift forks or shift oscillations, which are movable by means of hydraulic, pneumatic, or electric actuators. It is also possible for shifting systems to be activated from the shaft's center to the outside.

As an advantageous configuration the last gear wheel stage is positioned at the output side, of the second sub-transmission with both fixed wheels on the transmission output shaft or on the associated counter shaft linked with the first winding sub-transmission's output shaft, positioned on the output side, as a constant gear ratio, therefore as a output constant.

The transmission combination needs for the implementation of eight forward gear positions, in accordance with the winding design, a maximum of 2×3, or just six gear wheel stages in total, which has an economic effect as well as reducing the size and the weight. The combination demonstrates a high level of flexibility in the arrangement of the different gear wheel pairs and the choice of the individual gear ratios, so that numerous variations become available as the transmission's embodiment. A compromise is sought between a progressive and a geometric gradation of the transmission, with a, dependence on the application's shifting convenience and ride comfort, sufficient engine's use and transmission ratio spread. Thereby, the gear wheel pairs with either odd shift positions or even shift positions can selectively be assigned to both of the transmission input shafts.

Because certain actuators, which are designed as single elements facing each other on the drive shaft and the counter shaft, cannot be simultaneously shifted, a design can be provided, through effective coupling devices, for the increase of the shifting safety as well as for the reduction of the work load of the shift clutches, which can avoid a simultaneous operation of the actuators concerned. In a first modification, the coupling device is designed as a transversal, adjustable mechanical linkage between the axial common outer surfaces of sliding sleeves or synchronous sliding sleeves, respectively, of the adjacent positioned shift clutches. Subject to a second version, the coupling device is designed as a mechanical linkage, rotatable around its lateral axis, between the opposing outer surfaces of sliding sleeves and synchronous sliding sleeves, respectively, of the adjacent positioned shift clutches.

In addition, the design can be arranged to have a sub-transmission's arbitrarily predefined gear position working as a direct gear.

The invention's gear set allows the design of the gear ratio in a way so that a direct gear, positioned on the right, opposite from the double clutch sub-transmission at the output side, can be randomly selected. Hereby the target gear is a direct gear in one of the higher gear positions, for instance the sixth, seventh, or eighths gear. If the direct gear is not one of the highest gear numbers, the gears which are positioned after the direct gear are advantageously designed as overdrive gears. Depending on the direct gear, the gear wheel sets distinguish themselves at first by the gear ratio between the left sub-transmission, close to the double clutch, and the one on the right, distant from the double clutch, and in addition, by the gear ratio of the right sub-transmission, distant from the double clutch.

The gear wheel set, in accordance with the invention, can comprise one or several reverse gears which can be integrated in various ways.

For instance, it can be arranged that at least one gear wheel set of a reverse gear is located in either, the first or the second sub-transmission, whereby the reverse gear position's gear wheel set is positioned between two, arbitrarily pre-determined gear wheel planes.

As an example, the reverse gear can be designed as having a seventh gear wheel stage comprising one drive gear, one output wheel, and a reverse drive gear, used to reverse the rotation's direction. A reverse shift idle gear can, for that purpose, be linked through a synchronization with a suitable, available shaft, whereby it is advantageous to use an already available semi synchronization and to expand it to a double synchronization. Thus, the parts necessary for the reverse gear will be kept as minimal as possible. The positioning and the function of the reverse gear can be performed in both sub-transmissions. Basically, even by having just one reverse gear stage, two or more reverse gear positions can be realized.

It is also possible to implement a reverse gear position by using an additional planet gear set to reverse the turning direction, or by using an electric machine to drive in reverse.

The bearing support of the double clutch winding transmission in this invention is achieved by providing axially two outer and at least one inner, axially positioned bearing points.

The two axial, outer bearing points can be integrated advantageously into a front and back wall of the transmission's housing. The axial, inner bearing point is being preferably positioned between the two sub-transmissions and being integrated with the housing. It is also possible to design the axial, inner bearing point as a separate part, a so called bearing channel. Depending on the transmission's size and a calculated amount in regard to forces and load, additional bearing points might be meaningful, for instance between the fifth and the sixth gear wheel level.

Hereby, all common bearing elements can be applied, i.e. deep groove ball bearings or slope ball bearings, respectively, roller bearing or needle bearing, respectively, or cone roller bearings, and positioned depending on the distribution of the load and meaningful design aspects in regard to the shaft's end pieces of the drive shafts and output shafts. The radial bearing of the double clutch transmission's remaining shafts and idle gears are preferably needle bearings. For the axial bearing, if required, either deep groove ball bearings, slope ball bearings, cone bearings or also axial needle bearings can be applied.

Wet and dry running clutches can be used as double clutches, preferably with an electro-mechanical hydraulic activation. Common sense suggests positioning a vibration damper between the combustion engine's crank shaft and the double clutch. The vibration damper can be designed as torsion vibration damper or as a dual-mass fly wheel. Also, hydraulic dampers are suitable.

The double clutch winding transmission can be integrated advantageously into modern vehicles having hybrid engines.

Basically, an electric engine can operate with any transmission's shaft. As an example, the electric engine can serve as the traction apparatus for starting the combustion engine for driving of the vehicle. In addition, it can be used as an auxiliary drive for synchronization or to drive a hydraulic pump. Inversely, the electric engine can be used and function as a generator system for regaining energy used during braking or used as an auxiliary brake.

In this case, the electric engine is positioned in the flow of drive to directly follow, coaxially, the double clutch or is positioned between an additional clutch, on the drive side, and the double clutch, such that the transmission can be optionally connected with the combustion engine or the electric engine. In addition, the electric engine can also be mounted, on the drive side or output side, on an additional countershaft, or be connected with the left, near the double clutch, or the right, distant from the double clutch, winding transmission, through an additional, coupled gear wheel which is located in the first or the sixth gear wheel.

BRIEF DESCRIPTION OF THE DRAWINGS

To more clearly describe the invention reference is made to the drawings of the specification, which include design examples of the present invention.

These show:
FIG. 3 a configuration of a single stage, four gear position, winding transmission;
FIGS. 4(a)-4(d) four variations of the transmission's energy flow as in FIG. 3;
FIG. 5 a configuration of a two stage, four gear position winding transmission;
FIGS. 6(a)-6(d) four energy flow variations of the transmission according to FIG. 5;
FIG. 11 a second shift scheme of a transmission with a sixth gear being a direct gear, according to FIG. 1 and FIG. 9;
FIG. 12 a first shift scheme of a transmission with a seventh gear as a direct gear, according to FIG. 1 and FIG. 9;
FIG. 13 a second shift scheme of a transmission with a seventh gear as a direct gear, according to FIG. 1 and FIG. 9;
FIG. 14 a third shift scheme of a transmission with a seventh gear as a direct gear, according to FIG. 1 and FIG. 9;
FIG. 15 a fourth shift scheme of a transmission with a seventh gear as a direct gear, in accordance with FIG. 1 and FIG. 9;
FIG. 16 a first shift scheme of a transmission with an eighth gear as direct gear, according to FIG. 1 and FIG. 9;
FIG. 17 a second shift scheme of a transmission with an eighths gear as direct gear, according to FIG. 1 and FIG. 9.

DETAILED DESCRIPTION OF THE PREFERRED EMBODIMENTS

Figure 1:
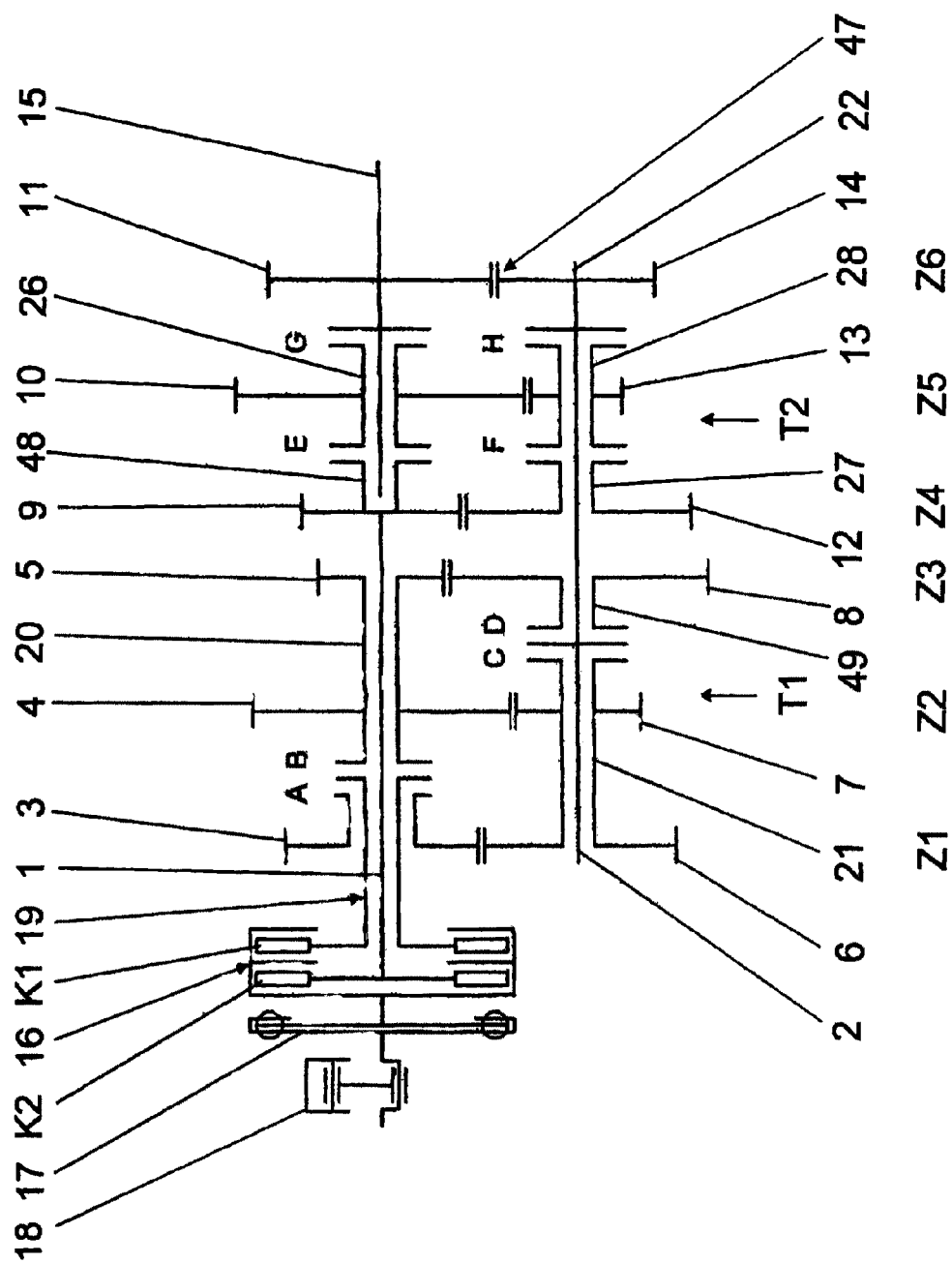
FIG. 1 a schematic outline, of an eight gear double clutch winding transmission in accordance with the invention, comprising two winding sub-transmissions.

Thus, FIG. 1 presents an eight gear position double clutch transmission for a vehicle in winding structure, having basically one first winding sub-transmission T1, positioned on the engine side of the double clutch transmission, and a second winding sub-transmission T2, positioned on the output side of the double clutch transmission.

The double clutch transmission comprises, as known in the art, a double clutch 16 which has two clutches K1, K2, which can be advantageously linked, via a vibration damper 17, with (shown symbolically with piston and crankshaft) a combustion engine 18. The double clutch 16 can be configured as a wet or a dry clutch and is preferably activated electro-mechanically or hydraulically. Conventional torsion vibration dampers as well as dual-mass fly wheels or hydraulic dampers are suitable for the vibration damper 17.

One clutch K1 is connected to the transmission input shaft 19, designed as hollow shaft, through which the first sub-transmission T1, positioned on the engine side, can be driven. The other clutch K2 is connected to the transmission's input shaft 1, which is concentrically positioned within the hollow shaft 19, and is designed as an inner, central shaft. By way of clutch K2, the second sub-transmission T2 is actuated.

Gear shift are performed, as known in the art, with an overlapping engagement and disengagement of both the clutches K1 and K2, whereby in the non-activated sub-transmission T1, T2, the sequentially, next gear to follow, is preselected.

In accordance with the invention, both the gear groups, one with the even numbered gears two, four, six, and eight, or with the odd numbered gears one, three, and five, and seven, respectively, can be electively implemented through either sub-transmission T1, T2.

In all the transmission structure's figures, the drive, herein the combustion engine, is shown to be on the left side and the output is on the right side. Accordingly, the terms "left" and "right" are being used in describing the figures. In the different variations of the described basic structures, for simplification, only the varying or additional, explicitly described components are being presented with reference characters, whereby, for simplification, similar elements have identical reference characters. Furthermore, the terms such as "top" and "bottom" are used, whereby the "top" is understood as a position being aligned with the drive, and the "bottom" as the position being aligned with the countershaft.

Figure 2:
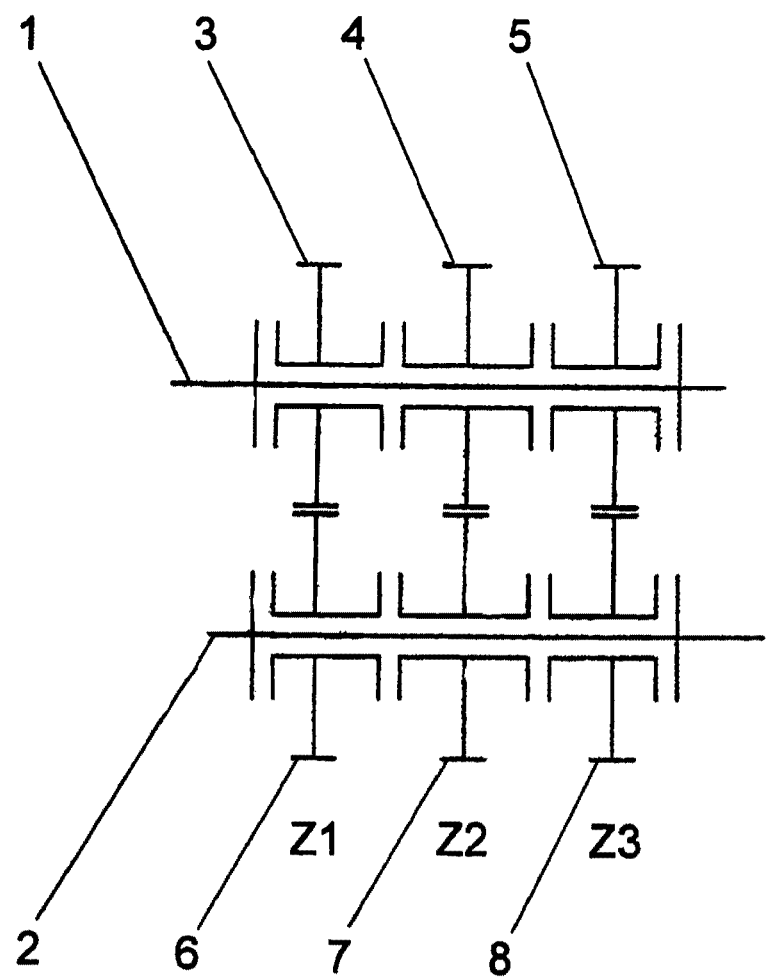
FIG. 2 a basic configuration of a four gear winding transmission.

The configuration of the inventive winding double clutch transmission, as an example and in accordance with FIG. 1, is being described hereafter through the detailed drawings and steps of FIG. 2 to FIG. 9:

The FIG. 2 shows the basic structure of a four gear winding transmission. On the main shaft 1 and the counter shaft 2, three gear wheels, 3, 4, and 5, or three gear wheels 6, 7, 8, respectively, are supported in position being independently rotatable and shiftable from each other, and can be connected with the associated shaft 1 or 2 in a rotationally fixed manner. Hereby and at any time, two adjacent gear wheels 3, 6, 4, 7, 5, 8, are meshed. The gear wheel pairs 3/6, 4/7, and 5/8 each respectively, form the gear wheel stages Z1, Z2, and Z3.

These basic structures are used to derive two different, winding transmissions, that are presented in FIG. 3 and FIG. 5 and are simplified when compared to the basic structures.

FIG. 3 shows a single-stage winding transmission W1 having a non-coaxial drive input and drive output. The gears 3, 4, 5, 6, 7, and 8 are rotatably supported on the shafts 1, 2. The main shaft 1 constitutes a drive shaft, the counter shaft 2, serves as the output shaft. The center gear wheel 4 and the right gear wheel 5 positioned on the drive shaft 1 and the left gear wheel 6 and the center gear wheel 7 positioned on the output shaft 2 are permanently linked to each other, on the hollow shafts, which are passed through, by the main shaft 1 or counter shaft 2, or one of each hollow shaft's segment 20 or 21, respectively, to which the meshed gear wheels 4/5, 6/7 are attached. The left side gear wheel 3 can be supported individually on drive shaft 1, whereas the center gear wheel 4, and the right gear wheel 5, are connected together and supported on the drive shaft 1, and the left side gear wheel 6 and the center gear wheel 7 are connected together and supported on the output shaft 2, and the gear wheel 8 is single wheel, which is positioned on the hollow shaft or the hollow shaft segment 49, respectively.

Hence, four possible energy flows L1 to L4 result, which are highlighted in the partial embodiments of 4(a)-4(d). It becomes obvious that there is (at least) one energy flow L4 within the four gear position winding transmission W1, as outlined in FIG. 3, which winds through the transmission and flows, in this case, to the bottom in the first gear level Z1, in the second gear level Z2 to the top, and in the third gear level Z3 back to the bottom. Within the other three energy flows L1, L2, and L3, the energy flow in the gear wheel level Z1, Z2, and Z3 takes place only along the bottom.

FIG. 5 shows a two-stage winding transmission W2, utilizing a coaxial drive input and drive output. The drive shaft 1 is fixed to an input gear wheel 9, which is attached to a hollow shaft or the hollow shaft segment 48. An output shaft 15 is positioned coaxially to the drive shaft 1, and supports a fixed wheel 11 in a rotationally fixed manner. Between the left side gear wheel 9 and the right side gear wheel 11, a central loose gear wheel 10 is provided, rotatably supported on output shaft 15, being fixed on a hollow shaft 26 and a hollow shaft segment, respectively. The loose gear wheel 10 is selectively connectable with the drive shaft 1 or the output shaft 15. These three top gear wheels 9, 10, 11, mesh with the three bottom gear wheels 12, 13, 14, which are supported on a counter shaft or the countershaft 22, respectively, and form three gear wheel levels Z4, Z5, Z6 (FIG. 1). The left and the central gear wheels 12, 13 are designed as idle gears and the right gear wheel is rotationally fixed to the countershaft 22. The two bottom idle gears 12, 13 are selectively connected in a rotationally fixed manner with the counter shaft 22. The two meshing fixed gear wheels 11, 14, on the right, form a transmission's output constant 47.

This transmission's four energy flows L5-L8 are explained in detail with reference to FIGS. 6(a)-6(d). It can be seen in these that the energy flow L5, L6, L7 of the first three variations (a), (b), (c), proceed through the first or the central gear level Z4, Z5 towards the bottom and returns to the top through the central or right gear levels to the top. Only the last energy flow L8, as detailed in (d), is non-winding, but, by enabling a direct link between the drive shaft 1 and the output shaft 15, offers a direct gear, whereby the energy is transmitted through the transmission, without flowing through the gear wheel's level and the gear wheels.

The two simplified embodiments of the winding transmission W1 and W2 in FIG. 3 and FIG. 5 can be sub-transmissions, in accordance with the invention, and combined to form different, eight gear double clutch transmissions.

Figure 7:
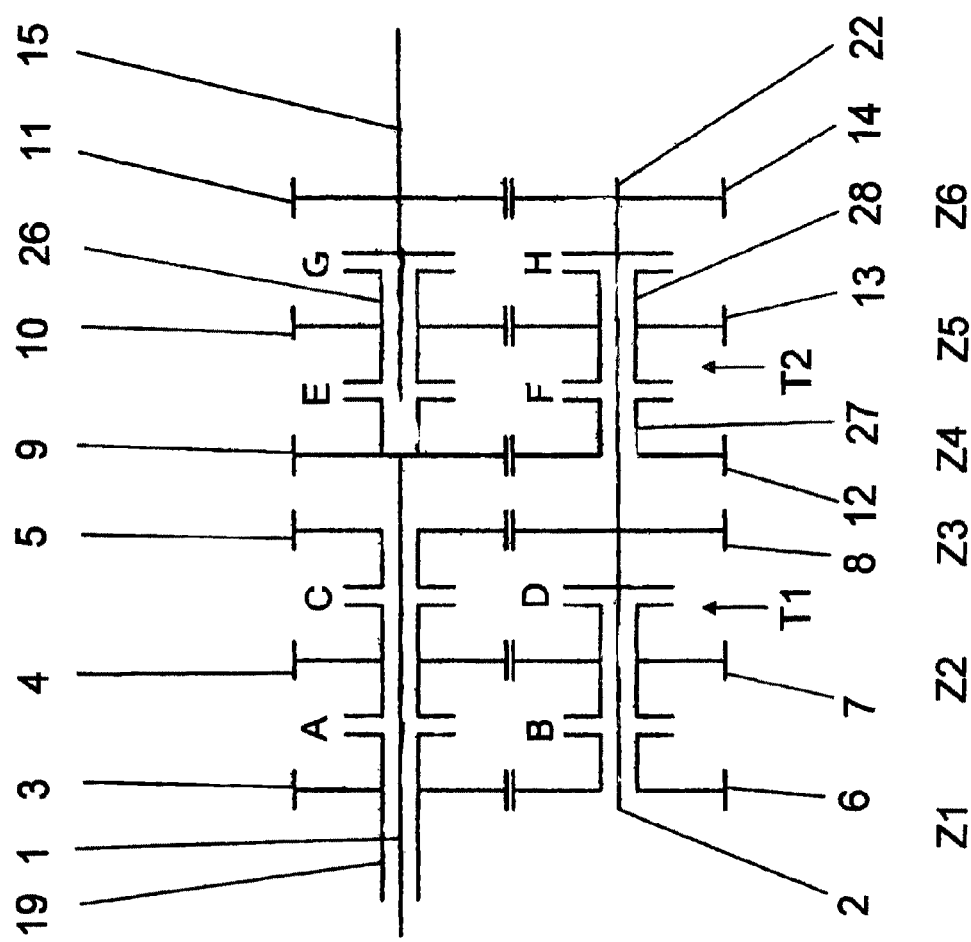
FIG. 7 a first, schematic configuration gear wheel sets of an eight gear double clutch winding transmission.
Figure 8:
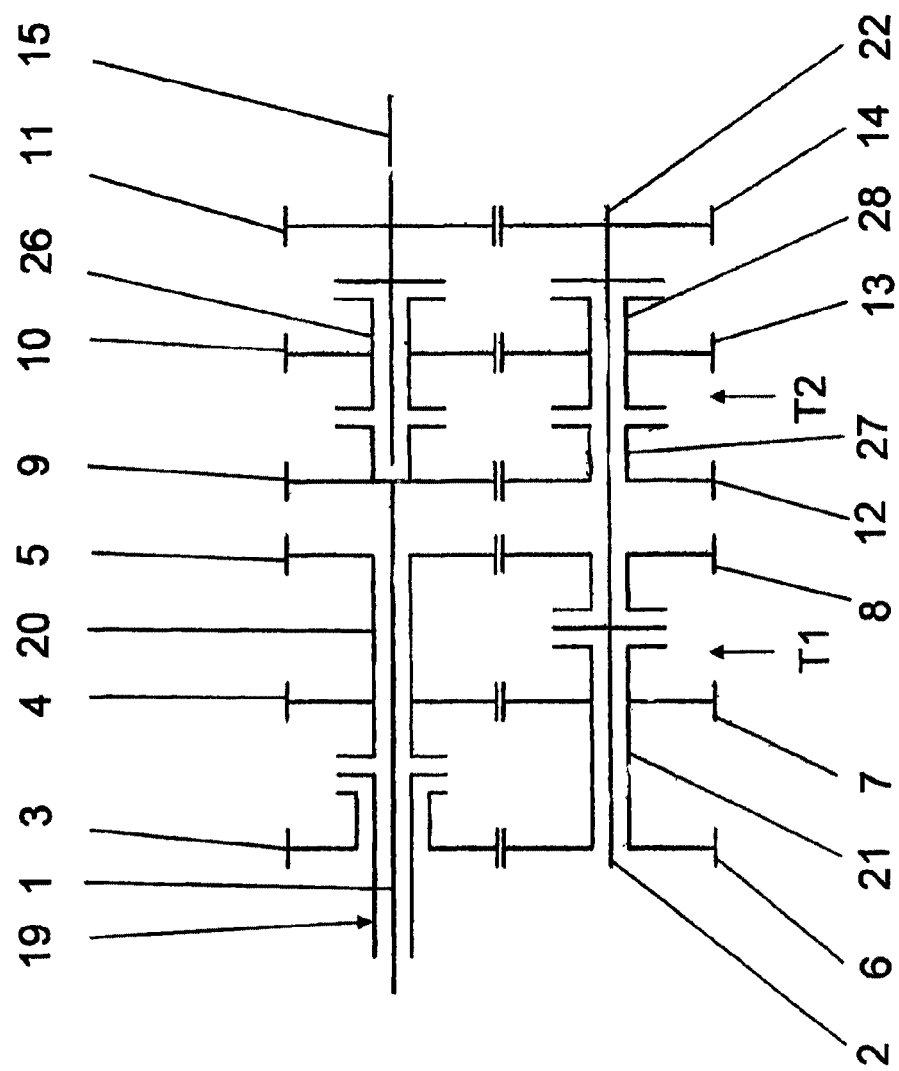
FIG. 8 a second, schematic configuration of gear wheel sets based on the double clutch winding transmission's eight gear position, according to FIG. 1.

This type of gear set is shown in FIG. 7 and FIG. 8. The embodiment of FIG. 8 corresponds with the double clutch transmission as in FIG. 1, however the two embodiments of FIG. 7 and FIG. 8 differ in the left sub-transmission 1, whereby in the first embodiment (FIG. 7) the designated shift elements A, B, C, D which are for example synchronizers or claw couplings, needed to shift the shift gears 3, 4, 5, 6, 7, 8, are designed and positioned as single elements, for instance as so called semi-synchronizers, while in the second embodiment of FIG. 8 the shift elements A, B, C, D are joined as pairs and are commonly effective shift units on both sides. The shift elements E, F, G, H in the right sub-transmission T2 are designed in each case as single elements (see also FIG. 1).

The left sub-transmission T1 is coupled, via the corresponding clutch K1, gear wheels 3, 4, 5, which are supported in the single stage winding transmission W1 (FIG. 3) on the drive shaft 1 which rotatably supports the hollow shaft segment 20, and the transmission's input shaft 19 which is designed as hollow shaft. The hollow shaft 19 alone is designed to extend to the shift point of the shift elements A, B, such that the gear wheels 3, 4, 5 are supported on two or three hollow shaft segments, whereby the energy flow through the shift elements A, B, is directed at the segment's end point.

The inner transmission shaft 1 passes through the hollow shaft 19 and connected, via the second clutch K2, to the right sub-transmission T2, as already explained above in FIG. 5. The two transmission input shafts 1, 19 and the coaxial transmission output shaft 15 form a drive axis of the combined transmission. In addition, the counter shafts 2, 22, respectively, of both sub-transmissions T1, T2 are interconnected, so that the output of the left sub-transmission T1 is directly connected with the drive constant 47 (gear wheels 11 and 14). The countershafts 2, 22 form a transmission's countershaft axis.

In FIG. 8, the hollow shaft segment 20 corresponds, by definition, to the transmission input shaft 19. The central gear wheel 4 and the right gear wheel 5 are designed as fixed wheels and are positioned on hollow shaft 19 or the hollow shaft segment 20, respectively. The left gear wheel 3 at the transmission's input is a loose gear wheel supported on hollow shaft 19. Between idle gear 3 and the hollow shaft segment 20, the shift elements A, B as in FIG. 7 are designed as a cluster and arranged in a way, such that the transmission input shaft 19 is selectively connectable with idle gear 3 or the hollow shaft segment 20 which support the center gear wheel 4 and the right gear wheel 5.

Figure 9:
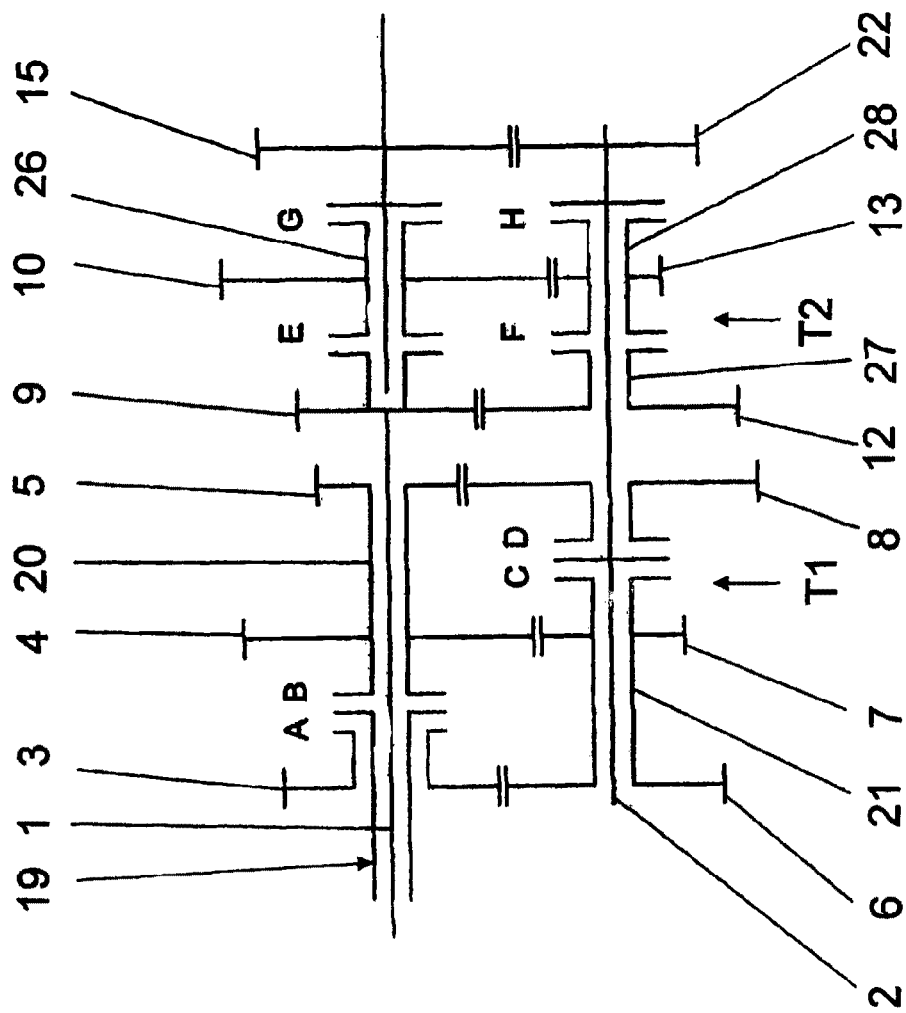
FIG. 9 the double clutch winding transmission's gear wheel set, according to FIG. 1,
FIG. 10 a first shift scheme of a transmission with a sixth gear being a direct gear, according to FIG. 1 and FIG. 9.

FIG. 9 shows the gear set configuration of FIG. 8 and FIG. 1, whereby the gear wheels are presented, for simplification purposes, as different gear ratios, utilizing the gear wheel pairs and the related gear wheel's diameters (number of gear wheel teeth) for the different shift stages. In addition, the shift elements of both sub-transmissions T1, T2 are explicitly marked in capital letters A to H.

The gear ratio configuration of the gear sets of FIG. 9 corresponds to a transmission with 8 forward gears with the sixth gear is being a direct gear. The herewith related shift scheme is presented in a tabular format in FIG. 10. Additional shift schemes are shown in FIG. 11 to FIG. 17.

In each shift position two of the shift elements A to H are engaged in the transfer of the torque and the associated clutch K1 or K2 is engaged. Hereby, the shift positions one and three, five and seven, two and four, as well as six and eight, form four groups. Within a group, the left shift element remains un-shifted. The groups in these tables are highlighted in each case by a frame, for easy recognition of the group shifts between the optional groups within the sub-transmissions.

In addition, the associated gear ratios "i" have been listed in the second to last column. The ratio between the largest and the smallest gearing results in the value "$i_{ges}$", mentioned in the lower right hand corner of the table (in bold). The last column's upper rows contain the related transmission steps φ, called the step changes, between the shift positions. The transmission's steps derive from the guideline to have the driving motor operating on a characteristic curve, between maximum torque and maximum energy. Under a simple geometric gradation, the steps would be constant, meaning that the difference of the gear position's maximum speed would increase with the higher gear position. This fact is more appropriately applied to utility vehicles. In a progressive-only gradation, the step changes would constantly decrease with the higher gear positions, meaning that the differences between the gear position's highest speeds would be approximately constant. This fact is more appropriate for passenger cars. From the φ-values as shown in the table of FIG. 10 and also presented in the following shift schemes of FIG. 11 to FIG. 17, it can be recognized that the selected transmission gradation of the eight gear double clutch winding transmission represents a compromise between geometric and progressive transmission gradation.

In the first shift scheme of FIG. 10, the odd gear positions are associated with the left, sub-transmission T1, closest to the double clutch. The first gear can be implemented by engaging the shift elements A and D, the third gear by engaging the shift elements A and C, the fifth gear by engaging the shift elements B and D, and the seventh gear by engaging the shift elements B and C. The even gear positions are associated with the right sub-transmission T2, remote from the double clutch whereby the second gear is implemented by engaging the shift elements F and G, the fourth gear by engaging the shift elements F and H, and the sixth gear by engaging the shift elements E and H. The related energy flows L1 to L8 are being highlighted in FIG. 4 and FIG. 6.

The single gear ratios, in this configuration, have been selected according to FIG. 10, in a way that the above described group shifting takes place between the shift elements A and B, as well as between E and F. The gear ratios are calculated between i=4.40 and i=0.59, which results in a spread ratio of $i_{ges}$=7.40, whereby the sixth gear position, with a gear ratio of i=1.00 is designed as a direct gear. The shift change between gears varies between φ=1.44, from the first to second gear, and shift change φ=1.25 from the seventh to the eighth gear.

Through variation and/or exchange of the gear ratios in the gear wheel stages Z1 to Z6, further shift schemes are possible.

In accordance with the shift scheme of FIG. 11, the first gear wheel stage Z1 and the third gear wheel stage Z3 have been exchanged, whereby the flow of energy (FIG. 4) is altered, such that the third gear position is implemented by engagement of the shift elements B-D instead of elements A-C and in the fifth gear position engagement of shift element B-D is changed to A-C. The group shifting is hereby being accomplished between the shift elements C-D and E-F, respectively.

Through the shift schemes in FIG. 12 to FIG. 15, the different, possible flows of energy in the seventh gear position, being the direct gear, are covered. Therein, the odd gear positions are associated with the second clutch K2, and the second sub-transmission T2, respectively, and the even gear positions are associated with the first clutch K1, and the first sub-transmission T1, respectively. In the shift schemes, the third and the fifth gear position have been switched, and the fourth and sixth gear positions, have been switched.

Accordingly, the flow of energy will alter in the left sub-transmission T1 (FIG. 4) and the right sub-transmission T2 (FIG. 6). The spread of ratios in the transmission is $i_{ges}$=6.68 with step variations ranging between $\phi$=1.42 and $\phi$=1.27. In particular, group shifting takes place between the shift elements A-B, or E-F, respectively, in (FIG. 12); A-B or G-H, respectively, in (FIG. 13), C-D or E-F, respectively, in (FIG. 14), and C-D or G-H, respectively, in (FIG. 15).

Two additional shift schemes are presented in FIG. 16 and FIG. 17. Therein, a transmission with the eighth gear as direct gear and a spread of $i_{ges}$=6.63, with step changes ranging from $\phi$=1.42 to $\phi$=1.22 has been configured. The odd gear positions are hereby, like in the variations having the sixth gear position as a direct gear (FIG. 10, FIG. 11), shiftable by means the first clutch K1, with the first and the third gear wheel stages being exchanged. The single gear ratios have been determined in a way that the group shifts take place between A-B and G-H, respectively, in (FIG. 16), or between C-D or G-H, respectively, in (FIG. 17).

Figure 18:
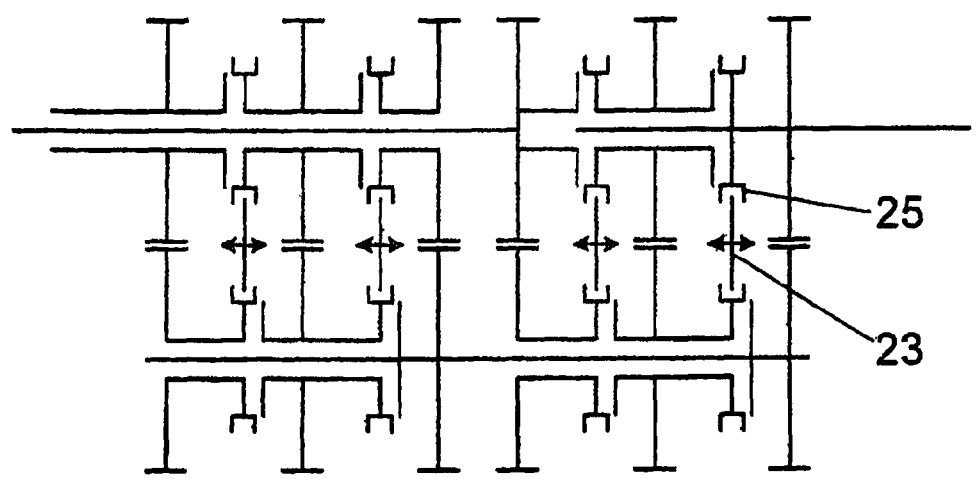
FIG. 18 the gear wheel set according to FIG. 7, comprising a transversal interconnection of the opposite shift elements.
Figure 19:
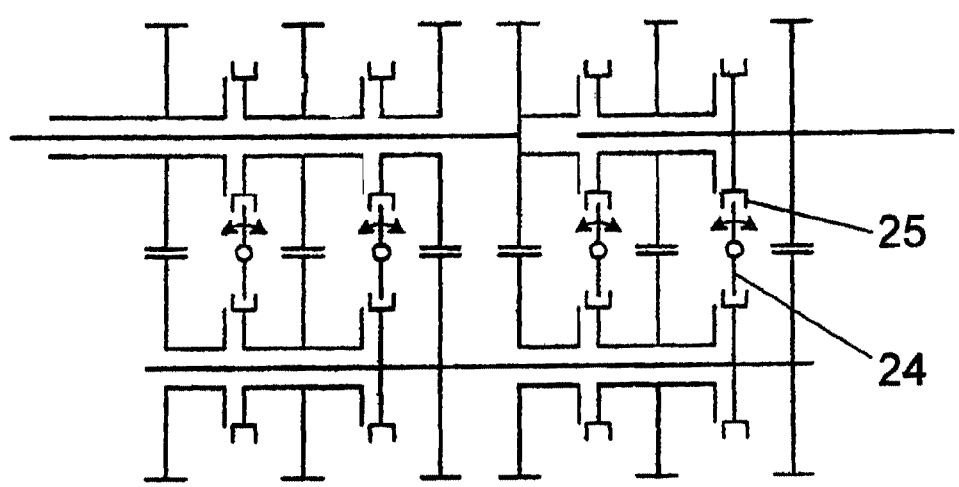
FIG. 19 the gear wheel set according to FIG. 7, comprising a rotary interconnection of opposite shift elements,
FIG. 20 a gear wheel set, according to the invention, with synchronization units in both of the winding sub-transmissions.

Resulting from the different, possible flows of energy of L1 to L8 and the shift schemes, it can be concluded that the shift elements A to H, configured as being positioned on the drive input shaft and the counter shaft, opposed to each other, shall not be shifted simultaneously. Advantageous, mechanical coupling devices 23 and 24 are being provided, to ensure that only one of the opposing shift elements A-H can be activated at the time. Two different mechanical coupling options are presented in FIG. 18 and FIG. 19, respectively, whereby this concept as shown in FIG. 18 has been configured by utilizing transversally moving coupling elements 23, and in FIG. 19 this accomplished with rotatable coupling elements 24, which are connected with the synchronizers moving sleeves 25. The moving direction, in each case, is illustrated by double arrows.

Figure 20:
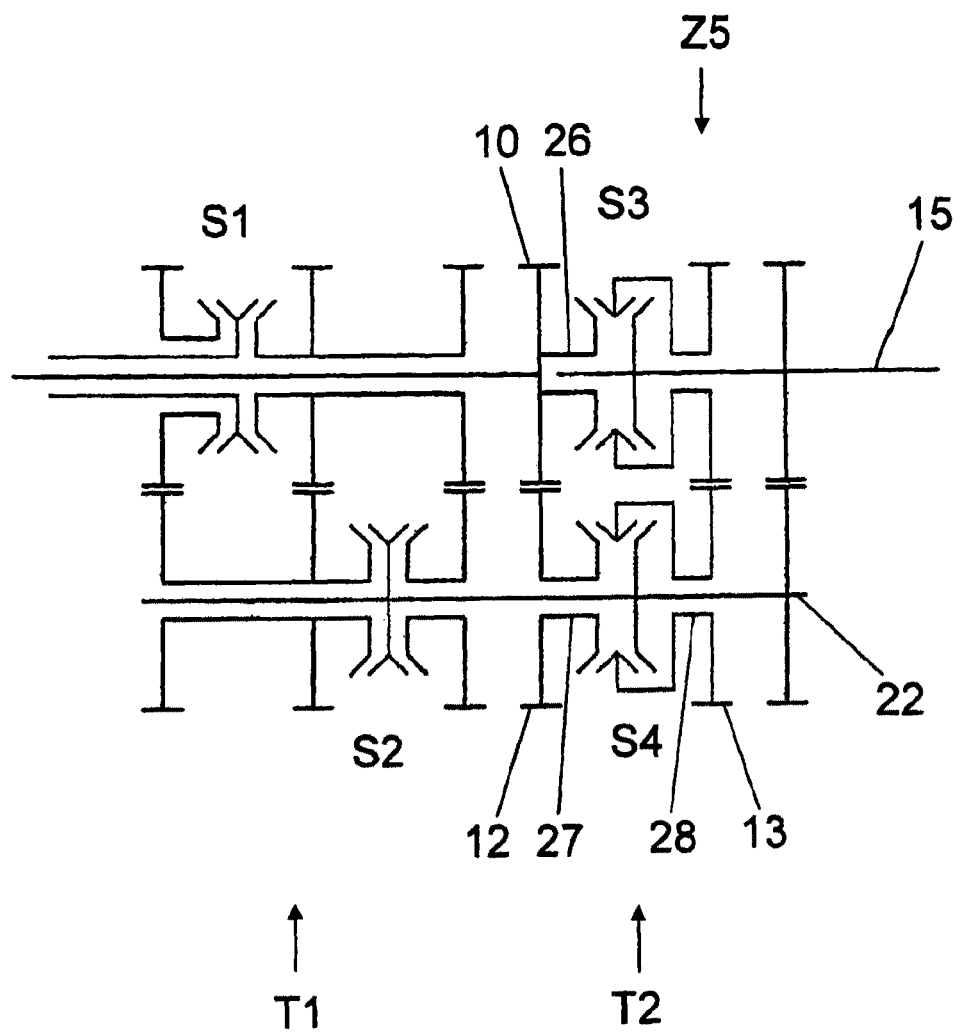
Figure 21:
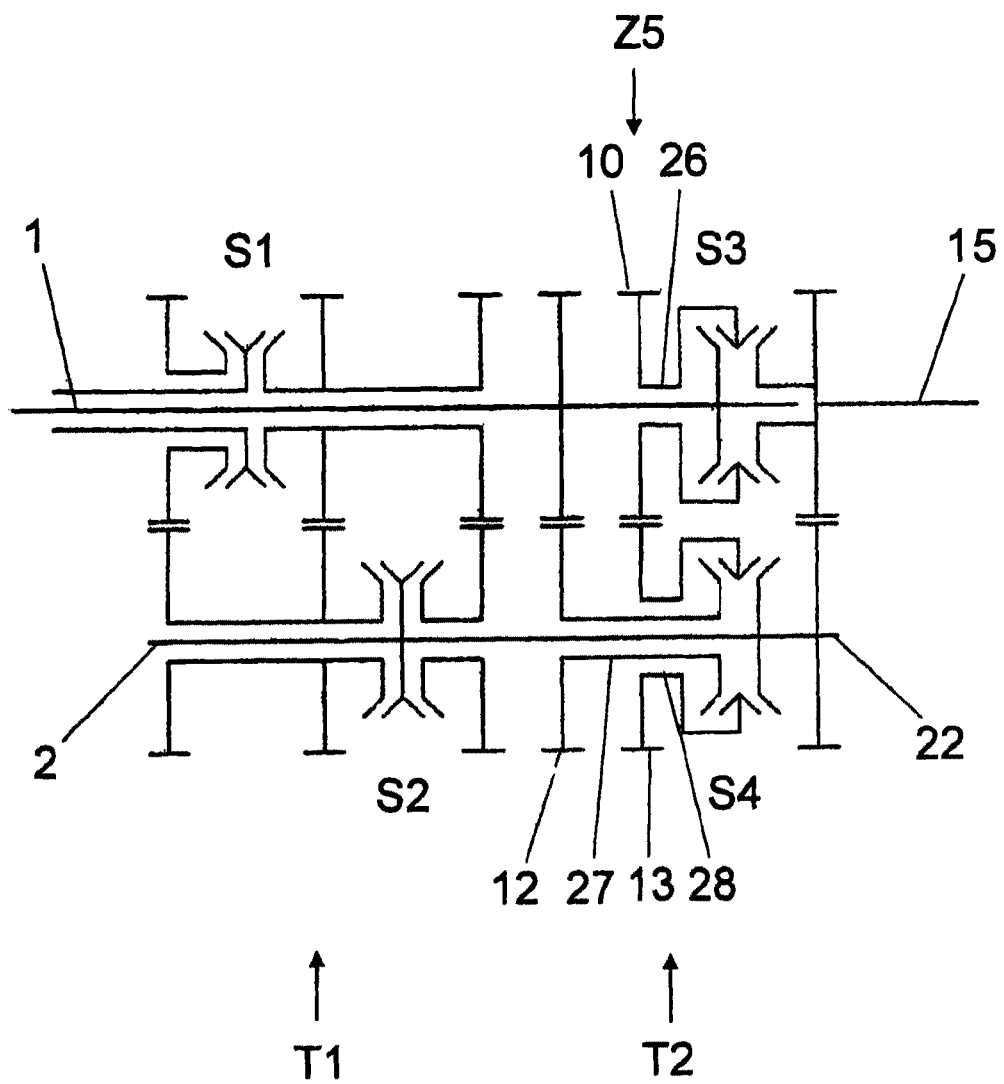
FIG. 21 the gear wheel set of FIG. 20 comprising a first, alternatively designed synchronization in the right winding sub-transmission.
Figure 22:
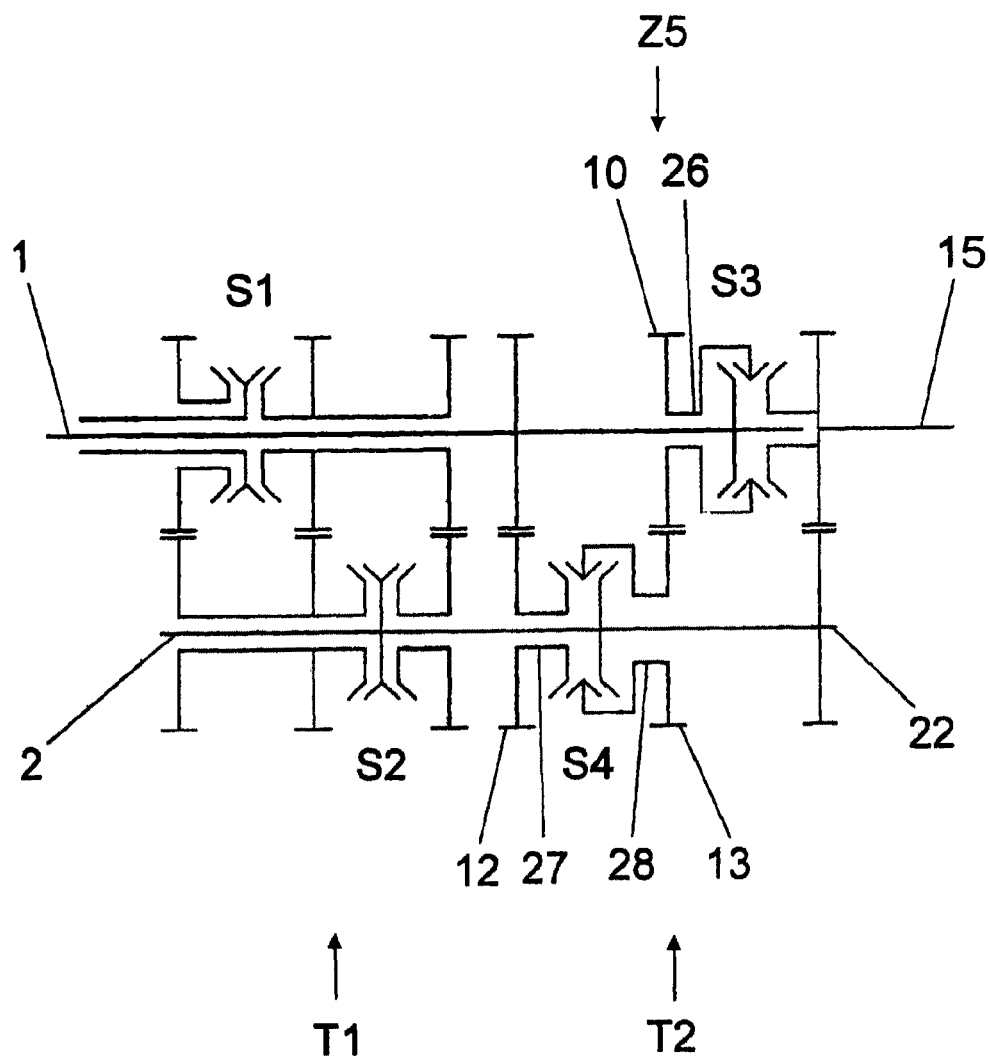
FIG. 22 the gear wheel set of FIG. 20, comprising a second, alternatively designed synchronization in the right winding sub-transmission.

Different synchronization configurations are presented in FIG. 20, FIG. 21, FIG. 22, FIG. 23, and FIG. 24. Therein, each of the synchronization units S1 and S2 are located in the left sub-transmission T1, one on the drive shaft and the other on the counter shaft. In FIG. 20, FIG. 21, and FIG. 22, the right sub-transmission T2 also contains the synchronization units S3, S4, however, the link to the appropriate (not shown) gliding sleeve is being performed externally.

The synchronizations S3 and S4 are designed such so that shift positions exist in which all three participating shafts can be connected, for example the transmission shaft 1, the output shaft 15, and the central idle gear 10, which is positioned on the hollow shaft 26 on the drive shaft, are connected as well as the counter shaft 2/22, the left idle gear 12, which is positioned on the hollow shaft 27, and the central idle gear 13 on the intermediate gear axis, positioned on the hollow shaft 28. Thereby, the synchronizations S3 and S4 can both be positioned left of the central idle gear level Z5, as shown in FIG. 20, or can both be positioned on the right of the idle gear level Z5, as shown in FIG. 21, or on the right and left, respectively, as shown in FIG. 22.

Figure 23:
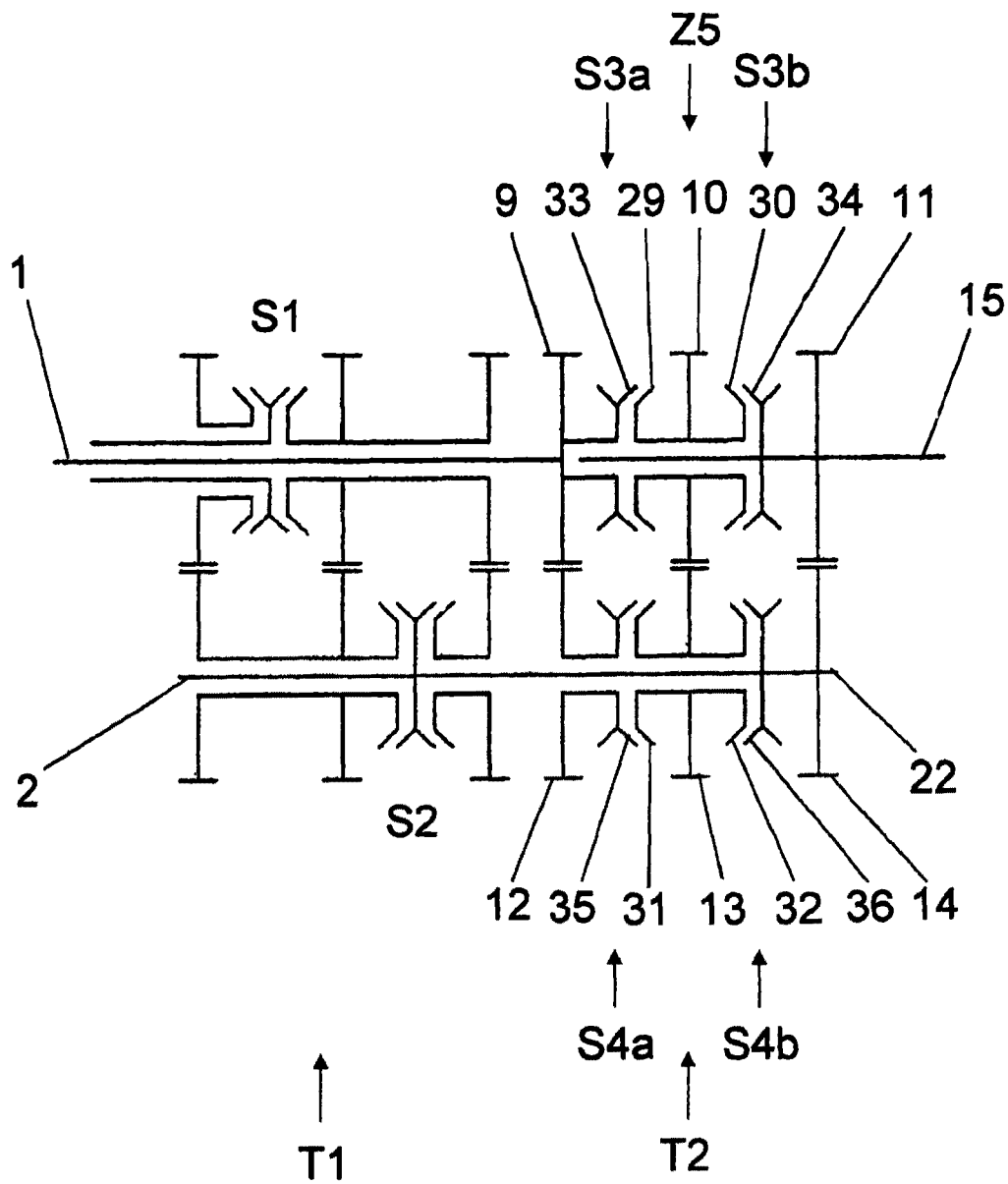
FIG. 23 a gear wheel set according to FIG. 7, comprising synchronization units in the left winding sub-transmission and semi-synchronizations in the right sub-transmission.
Figure 24:
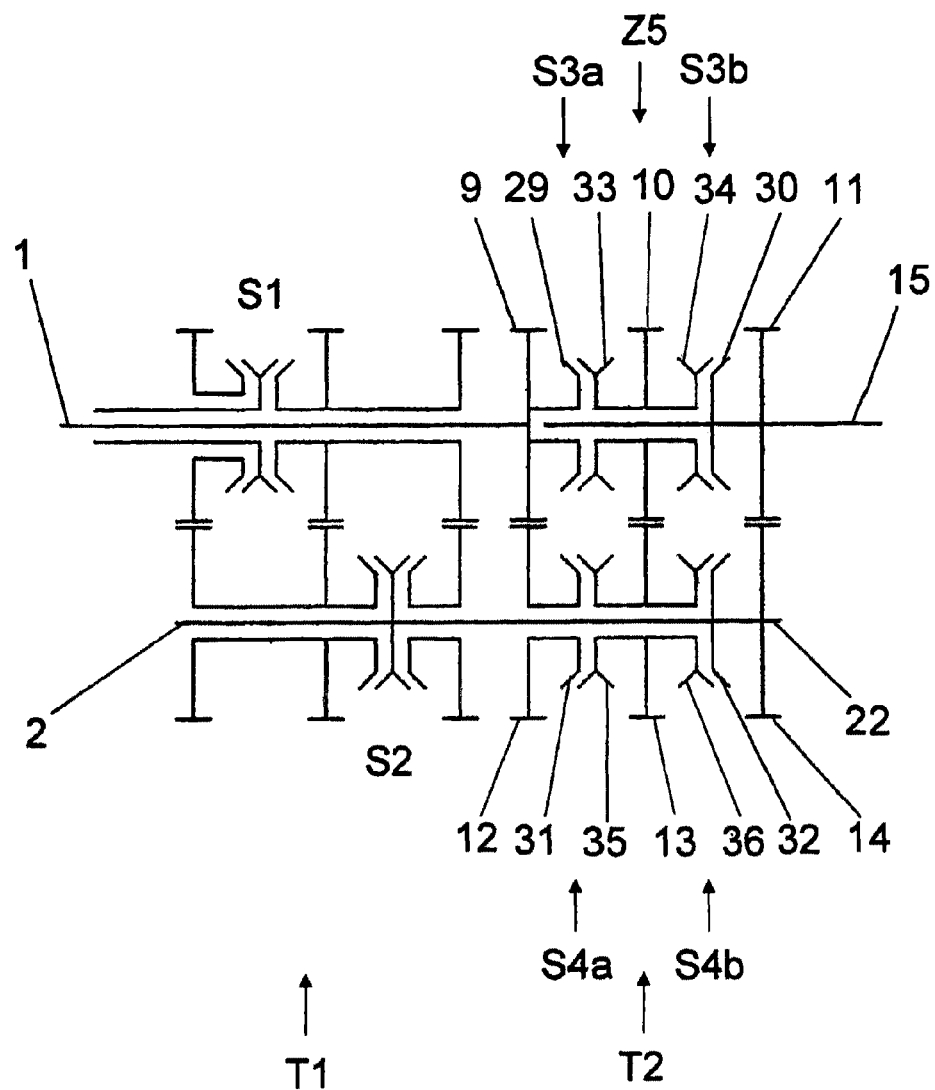
FIG. 24 the gear wheel set according to FIG. 23, comprising an alternative arrangement of the semi-synchronizations in the right sub-transmission.

If the synchronizers in the right sub-transmission T2 are not configured as clusters, but instead, as is shown in FIG. 23 and FIG. 24, as having a single effective side such as so called semi-synchronizations S3a, S3b, S4a, S4b, hereby, the related clutch body 29, 30, 31, 32 can be positioned either at the central, fifth gear wheel level Z5, in each case left and right of idle gear 10, 13, and the related synchronizer body 33, 34, 35, 36, can be positioned on the adjacent gear wheel 9, 11, 12, 14, as presented in FIG. 23, or reversed, as shown in FIG. 24.

Figure 25:
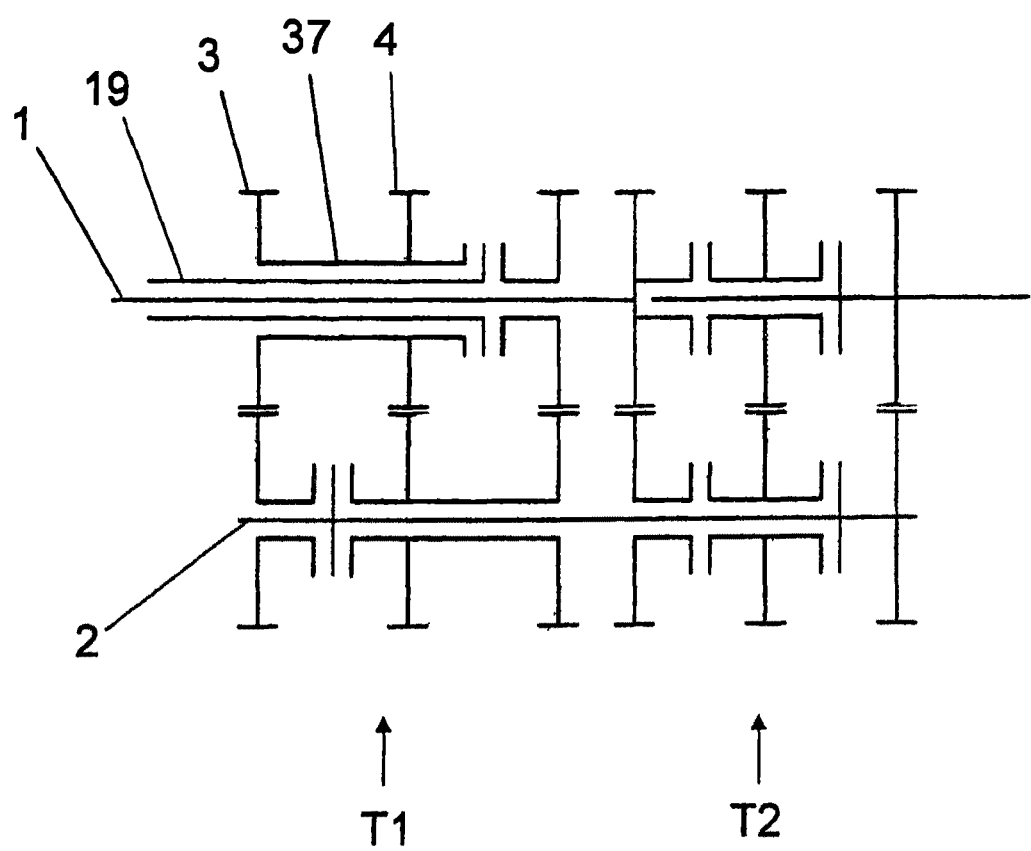
FIG. 25 a gear wheel set, comprising mirror-image of the gear stage level, of FIG. 8, in the left winding sub-transmission.

FIG. 25 shows a mirror image of the left sub-transmission T1. Therein, the left gear wheel 3 and the central gear wheel 4 are positioned on a hollow shaft 37, which is rotatably positioned on the hollow transmission input shaft 19.

Figure 26:
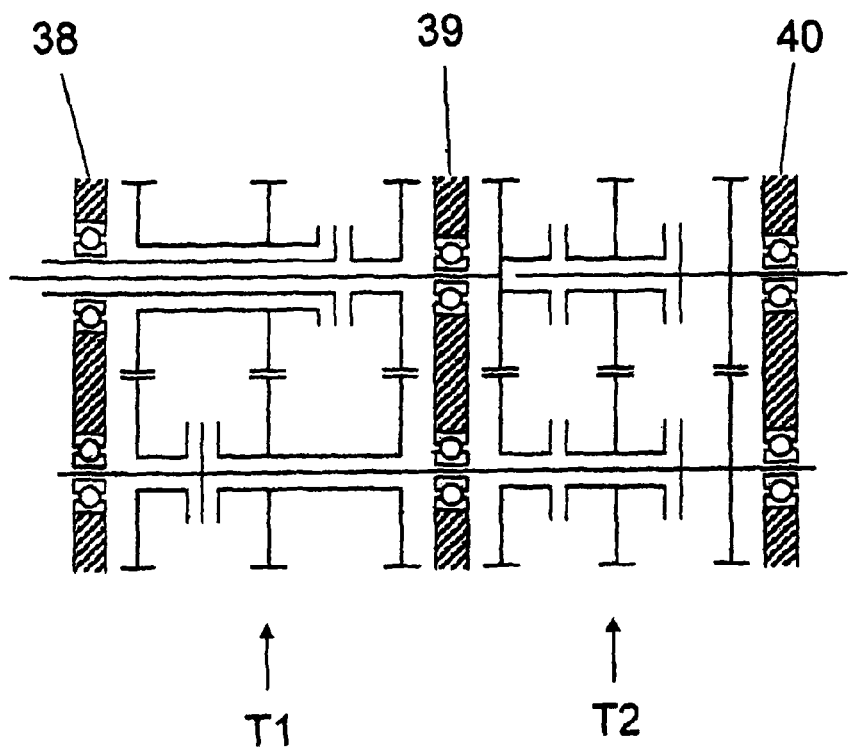
FIG. 26 the gear wheel set according to FIG. 25, comprising a schematic presentation of three bearing points.

This gear set configuration is also used in FIG. 26, which shows three bearing levels 38, 39, 40, whereby the left bearing level 38 is an integral part of a front section, close to the double clutch's housing wall, and the right bearing level 40 is an integral part of a rear housing wall, remote from the double clutch, an example transmission's housing. The center bearing level 39 is positioned between the two sub-transmissions T1, T2, and is advantageously designed as part of the transmission's housing. Bearings can be roll, ball, cone, or needle bearings, depending on the design and bearing forces, and are commonly available in the market and will not be further described.

Figure 27:
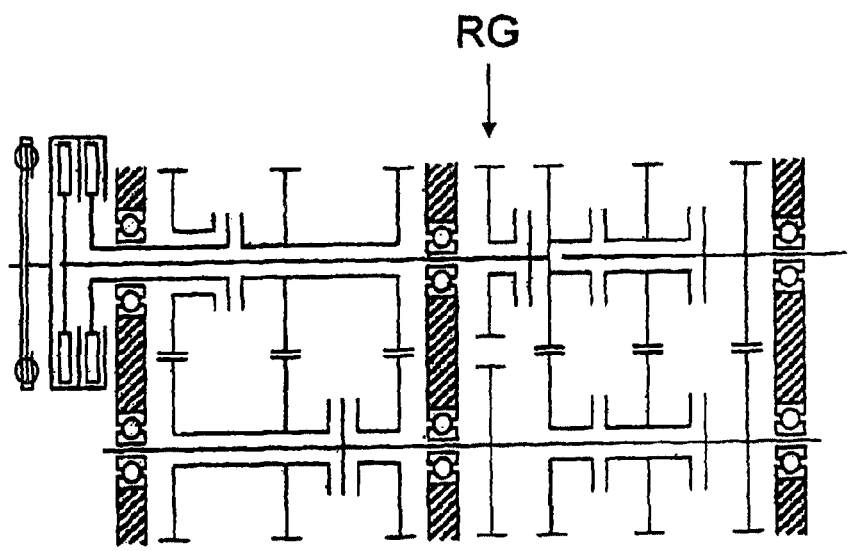
FIG. 27 the gear wheel set according to FIG. 8, comprising a reverse gear in the right winding sub-transmission.
Figure 28:
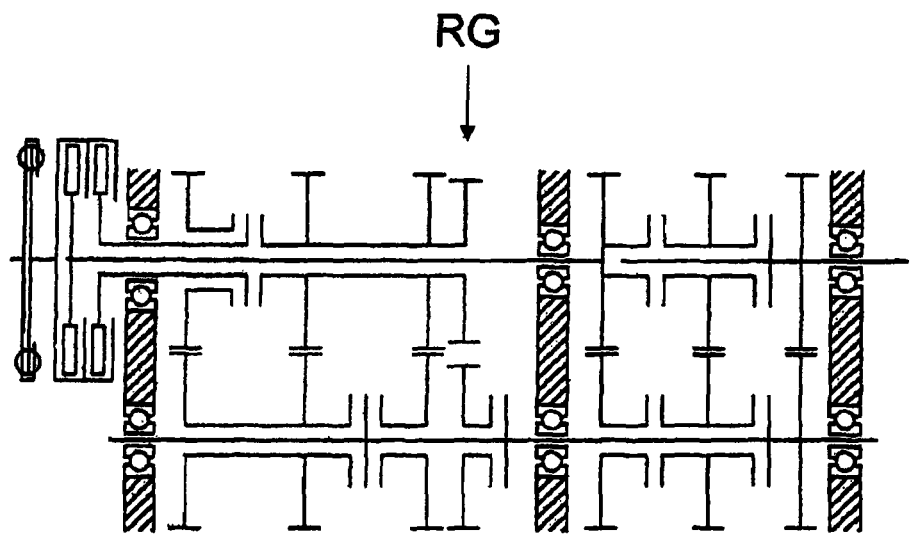
FIG. 28 the gearwheel set according to FIG. 8, comprising a reverse gear in the left winding sub-transmission.
Figure 29:
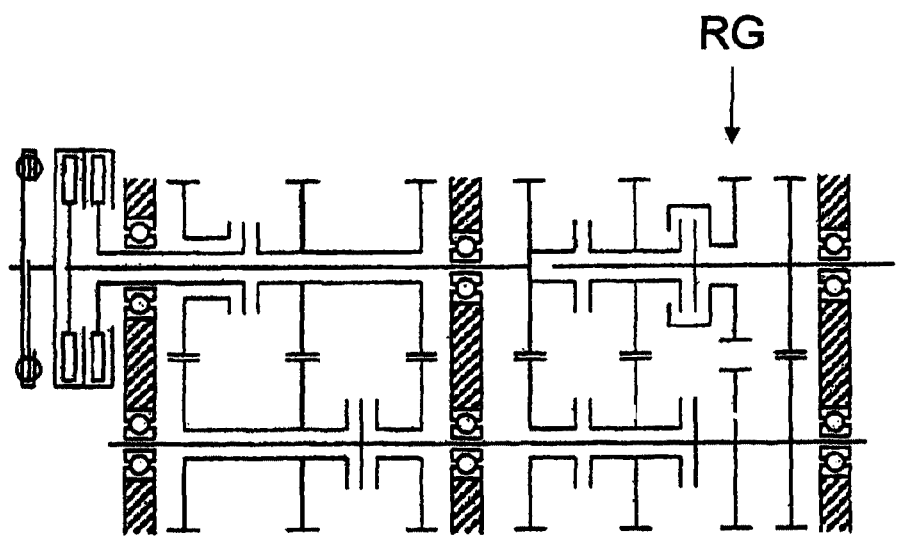
FIG. 29 the gear wheel set according to FIG. 8, comprising an alternative arrangement of the reverse gear in the right winding sub-transmission.

To complete the transmission, several configurations of reverse gear positions RG are presented in FIG. 27, FIG. 28, and FIG. 29. The reverse gear position RG has been realized by providing an additional gear stage. For instance, it can be located in the right sub-transmission T2 and configured as a front side gear wheel with an additional semi-synchronization (FIG. 27), or as a back side gear wheel, positioned in the left sub-transmission T1, with an additional semi-synchronization (FIG. 28), or as a central gear wheel level, positioned in the right sub-transmission T2, utilizing an already present semi-synchronization (FIG. 29).

Finally, FIG. 30 to FIG. 33 present the incorporation of the double clutch winding transmission, in accordance with the invention, in a hybrid driven vehicle. Herein, an electric machine 41, 42, 46 is schematically represented and is utilized to start the combustion engine 18, to drive the transmission, and/or used as a generator to regain the brake's energy.

Figure 30:
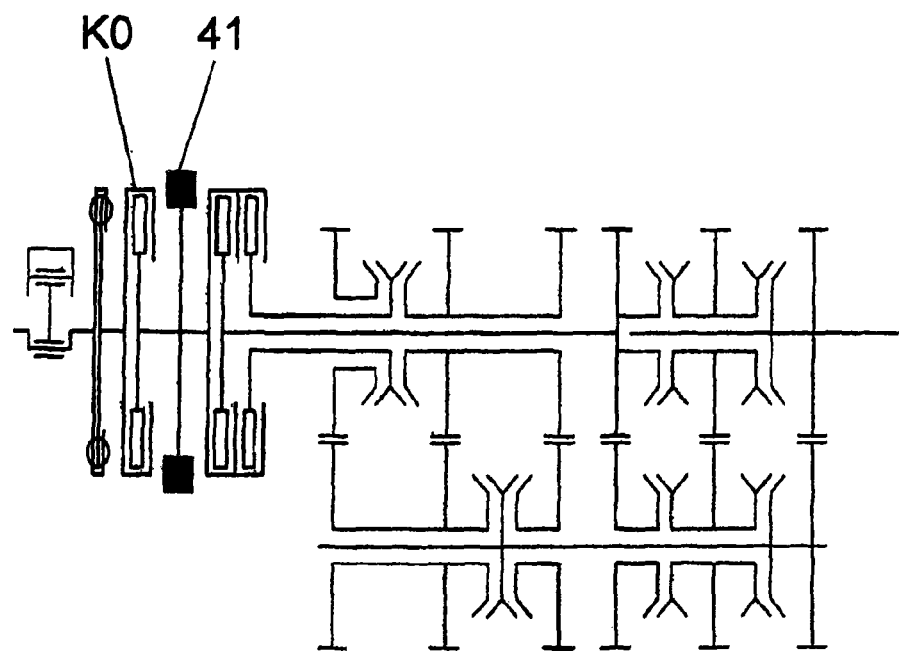
FIG. 30 a first embodiment of a double clutch winding transmission in combination with a hybrid drive.

FIG. 30 shows a configuration where the electric machine 41 is positioned between an additional clutch K0, located on the drive side, and the double clutch 16, and it affects the double clutch's input unit. Through the additional, drive side clutch K0, the transmission can selectively be coupled with the combustion engine 18 or the electric machine 41.

Figure 31:
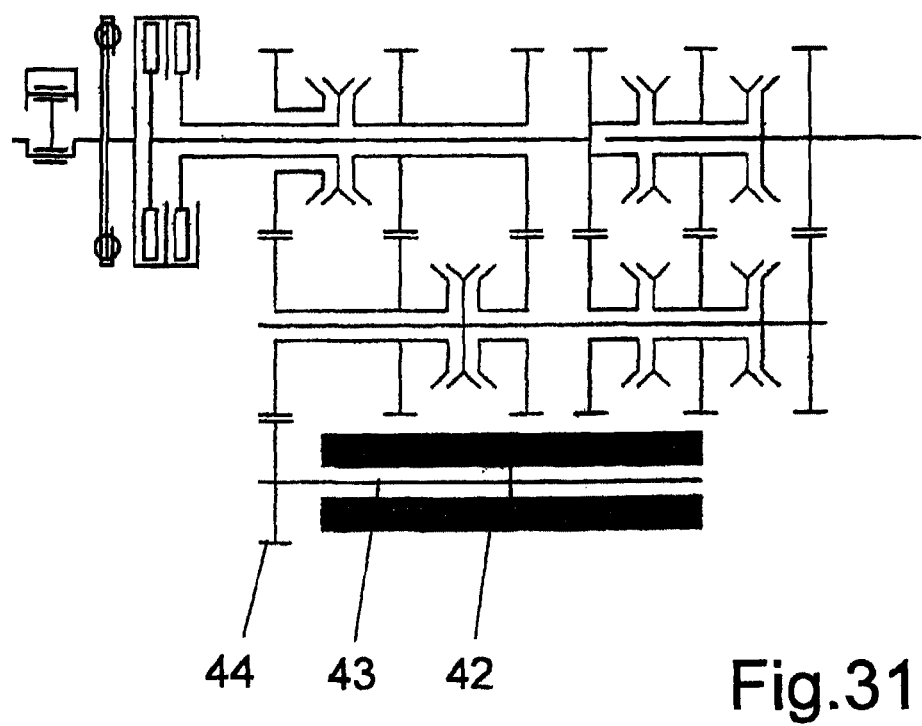
FIG. 31 a second embodiment of a double clutch winding transmission in combination with a hybrid drive.

In FIG. 31, the electric machine 42 is constructed in a so called "rd rotor" and its rotor is mounted on an additional counter shaft 43. The counter shaft 43 is coupled with the transmission via a gear wheel 43 in the gear wheel level Z1, which is in contact with the idle gear on the counter shaft.

Figure 32:
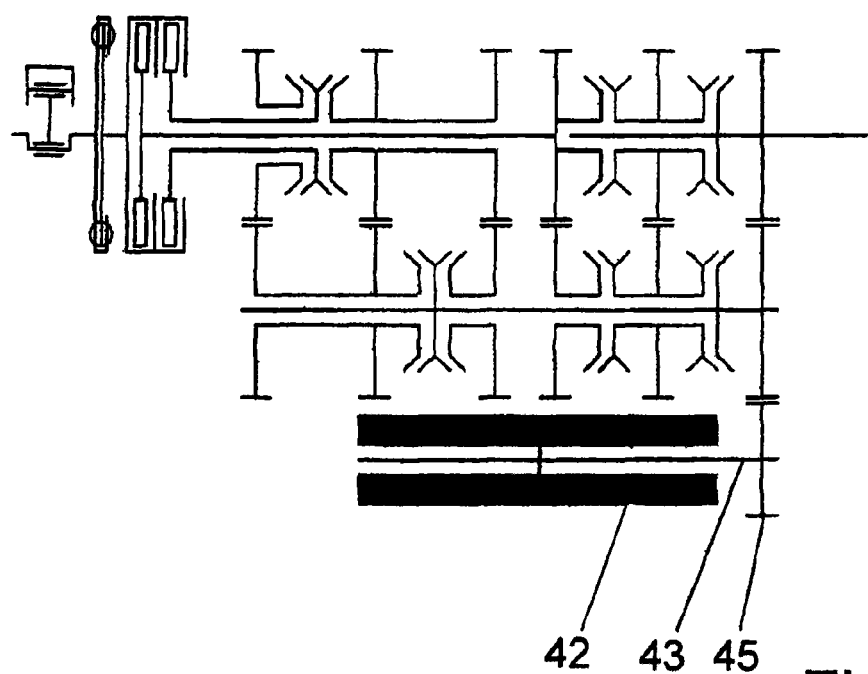
FIG. 32 a third embodiment of a double clutch winding transmission in combination with a hybrid drive.
Figure 33:
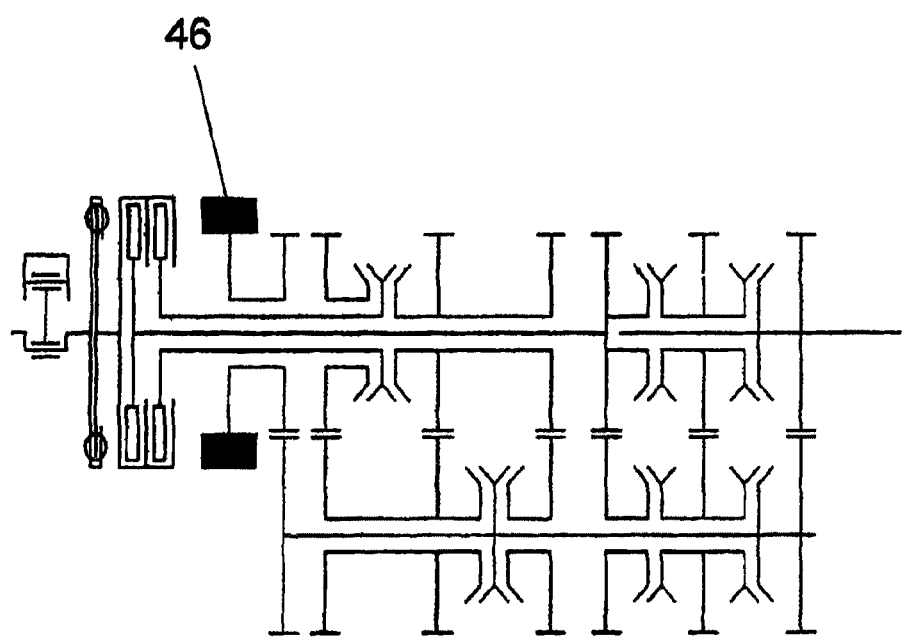
FIG. 33 a fourth embodiment of a double clutch winding transmission in combination with a hybrid drive.

FIG. 32 shows the same configuration, however, the electric machine 42 is connected with the transmission through an additional gear wheel 45, which is part of the right gear wheel 14 and the counter shaft output. FIG. 33 shows another configuration, where the electric machine 46 mechanically follows and is coaxially aligned with the double clutch 16, meaning it is positioned on the output side of double clutch 16.

DRAWING REFERENCE NOMENCLATURE

1. Inner Transmission Input Shaft/Main Shaft
2. Counter Shaft/Intermediate Shaft
3. Gear Wheel
4. Gear Wheel
5. Gear Wheel
6. Gear Wheel
7. Gear Wheel
8. Gear Wheel
9. Gear Wheel
10. Gear Wheel
11. Gear Wheel
12. Gear Wheel 13. Gear Wheel
14. Gear Wheel
15. Transmission Output Shaft/Output Shaft
16. Double clutch
17. Vibration Damper
18. Combustion Engine
19. Outer Transmission Input Shaft
20. Hollow Shaft
21. Hollow Shaft
22. Counter Shaft/Intermediate Shaft
23. Coupling Device
24. Coupling Device
25. Synchronizer
26. Hollow Shaft
27. Hollow Shaft
28. Hollow Shaft
29. Clutch Body
30. Clutch Body
31. Clutch Body
32. Clutch Body
33. Synchronizer
34. Synchronizer
35. Synchronizer
36. Synchronizer
37. Hollow Shaft
38. Bearing Level
39. Bearing Level
40. Bearing Level
41. Electric Machine
42. Electric Machine
43. Intermediate Shaft
44. Gear Wheel
45. Gear Wheel
46. Electric Machine
47. Drive Constant
48. Hollow Shaft
49. Hollow Shaft
A Shift Element
B Shift Element
C Shift Element
D Shift Element
E Shift Element
F Shift Element
G Shift Element
H Shift Element
K0 Clutch
K1 Clutch
K2 Clutch
L1 Energy Flow
L2 Energy Flow
L3 Energy Flow
L4 Energy Flow
L5 Energy Flow
L6 Energy Flow
L7 Energy Flow
L8 Energy Flow
RG Reverse Gear Position
S1 Synchronization
S2 Synchronization
S3 Synchronization
S4 Synchronization
S3a Semi-Synchronization
S3b Semi-Synchronization
S4a Semi-Synchronization
S4b Semi-Synchronization
T1 Sub-transmission
T2 Sub-transmission
W1 Winding Transmission
W2 Winding Transmission
Z1 Gear Wheel Level
Z2 Gear Wheel Level
Z3 Gear Wheel Level
Z4 Gear Wheel Level
Z5 Gear Wheel Level
Z6 Gear Wheel Level
i Gear Ratio
$i_{ges}$ Transmission Spread
φ Shift Change/Grading Factor

The invention claimed is:

1. A double clutch winding transmission comprising:
first and second sub-transmissions (T1, T2), a double clutch (K1, K2), at least one counter shaft (2, 22) and a transmission output shaft (15),
the first sub-transmission (T1) has a transmission input shaft (19) that is coaxially aligned with a transmission input shaft (1) of the second sub-transmission (T2) and the transmission output shaft (15),
the transmission input shafts (1, 19), of the first and second sub-transmissions (T1, T2), are each coupled to one clutch of the double clutch (K1, K2), such that a flow of energy (L1, L2, L3, L4, L5, L6, L7, L8) of at least one gear shift position is passed through at least two meshing gear wheels (3, 4, 5, 6, 7, 8, 9, 10, 11, 12, 13, 14),
each set of meshing gear wheels forming a gear wheel plane (Z1, Z2, Z3, Z4, Z5, Z6), and
the first and the second sub-transmissions (T1, T2) being first and second single winding transmissions (W1, W2) that are positioned one behind an another, in the double clutch winding transmission, and each comprise at least four forward gear shift positions;
wherein the first winding sub-transmission (T1):
is positioned on a drive input side of the dual clutch winding transmission;
has a multi-section hollow transmission input shaft (19, 20) through which the transmission input shaft (1) of the second winding sub-transmission (T2) passes; and
has a multi-section hollow shaft (21, 49) through which a counter shaft (2) of the first winding sub-transmission (T1) passes,
the second winding sub-transmission (T2):
is positioned on a drive output side of the dual clutch winding transmission;
has a multi-section hollow shaft (26, 48) with an input end coupled to the transmission input shaft (1) of the second winding sub-transmission (T2) and an output end through which the transmission output shaft (15) passes; and
has a multi-section hollow shaft (27, 28) through which a counter shaft (22) of the second winding sub-transmission (T2) passes, the counter shaft (22) of the second winding sub-transmission (T2) is coupled to the counter shaft (2) of the first sub-transmission (T1).

2. The dual clutch winding transmission according to claim 1, wherein the first sub-transmission (T1) is a single stage, four gear shift position, winding transmission (W1) which is positioned on a drive input side of the dual clutch winding transmission and has a parallel drive and output, and the second sub-transmission (T2), which is positioned on a drive output side of the dual clutch winding transmission, is a dual stage, four gear shift position, winding transmission (W2), and has a coaxial drive and output.

3. The dual clutch winding transmission according to claim 1, wherein the dual clutch winding transmission further comprises at least two reverse gear positions.

4. The dual clutch winding transmission according to claim 1, wherein the first winding sub-transmission (T1) has three gear wheels (3, 4, 5) associated with outer transmission input shaft (19, 20) and three gear wheels (6, 7, 8) associated with a counter shaft (2) which form three gear wheel planes (Z1, Z2, Z3), whereby on a drive side and on a counter shaft side two of the three gear wheels (4, 5; 6,7) are firmly connected in a mirror-image design, and a shift element (A, B, C, D) is located between the two connected gear wheels (4, 5; 6, 7) and the third gear wheel (3, 8).

5. The dual clutch winding transmission according to claim 1, wherein the double clutch (16) is either a wet clutch or a dry clutch.

6. The dual clutch winding transmission according to claim 1, wherein the dual clutch winding transmission further comprises at least one reverse gear of an additional, rotational reversing, planetary gear set.

7. The dual clutch winding transmission according to claim 1, wherein the first winding sub-transmission (T1) has three gear wheels (3, 4, 5) associated with outer transmission input shaft (19) and three gear wheels (6, 7, 8) associated with a counter shaft (2) which form three gear wheel planes (Z1, Z2, Z3), a gear wheel (8), positioned on the counter shaft (2) remote from the double clutch, is a fixed gear wheel, and a shift element (A, B, C, D) is positioned in each case between the remaining gear wheels (3, 4, 5, 6, 7).

8. The dual clutch winding transmission according to claim 1, wherein the dual clutch winding transmission further comprises at least one reverse shift gear position which is driven by an electric machine.

9. The dual clutch winding transmission according to claim 1, wherein the second winding sub-transmission (T2) has three top gear wheels (9, 10, 11), a left top gear wheel (9), facing the clutch, is rotationally fixed with the transmission input shaft (1) of the second sub-transmission (T2), a central top gear wheel (10) is an idle gear wheel, and a right top gear wheel (11), remote from the clutch, is rotationally fixed with the transmission output shaft (15), and the second winding sub-transmission (T2) has three bottom gear wheels (12, 13, 14), a left bottom gear wheel (12), facing the clutch, a central bottom gear wheel (13), and a right bottom gear wheel (14), remote from the clutch, is designed a fixed gear wheel, and the engaging top and bottom gear wheels (9, 12; 10, 13; 11, 14) form right, central and left gear wheel planes (Z4, Z5, Z6), and shift elements (E, F, G, H) are located between the the right gear wheel plane (Z4) and the left gear wheel plane (Z6).

10. The dual clutch winding transmission according to claim 1, wherein a fixed wheel (11), is positioned on the transmission output shaft (15), and meshes with a gear wheel (14) fixed on a counter shaft (22) which is coupled to a counter shaft (2) of the first winding sub-transmission (T1).

11. The dual clutch winding transmission according to claim 1, wherein each of the transmission input shafts (1, 19) is assigned either all odd numbered gear positions or all even numbered gear positions; and both the first and the second sub-transmissions (T1, T2) comprise only three gear wheel planes (Z1, Z2, Z3, Z4, Z5, Z6).

12. The dual clutch winding transmission according to claim 1, wherein a reverse shift position (RG) gear wheel set is positioned in either the first or the second sub-transmission (T1, T2) and the gear wheel set of the reverse gear (RG) is positioned between two of the gearwheel planes (Z1, Z2, Z3, Z4, Z5).

13. The dual clutch winding transmission according to claim 1, wherein either single sided or dual sided active synchronizers (S1, S2, S3, S4, S3a, S3b, S4a, S4b) are assigned to the gear shift positions.

14. The dual clutch winding transmission according to claim 13, wherein the dual clutch winding transmission further comprises a reverse gear position (RG) which has either an additional or an existing synchronization assigned to the reverse gear position (RG).

15. The dual clutch winding transmission according to claim 1, wherein the double clutch (16) has a vibration damper (17) located on an input side of the double clutch (16).

16. The dual clutch winding transmission according to claim 15, wherein the vibration damper (17) is one of a torsion vibration damper, a dual-mass fly wheel, and an active hydraulic damper.

17. The dual clutch winding transmission according to claim 1, wherein two axially outer bearing levels (38, 40) are respectively integrated into a front wall and a rear wall of a transmission housing and at least one axially inner bearing level (39) is located between the first and the second sub-transmissions (T1, T2).

18. The dual clutch winding transmission according to claim 17, wherein the axially inner bearing level (39) is integral with the transmission housing.

19. The dual clutch winding transmission according to claim 17, wherein the axially inner bearing level (39) is a stand-alone component.

20. The dual clutch winding transmission according to claim 17, wherein the dual clutch winding transmission further comprises an additional axially inner bearing level that is positioned between a fifth and a sixth gear wheel level (Z5, Z6).

21. The dual clutch winding transmission according to claim 1, wherein the dual clutch winding transmission further comprises a link to an electric machine (41, 42, 46) of a hybrid drive.

22. The dual clutch winding transmission according to claim 21, wherein the electric machine (46) is located coaxially with and downstream from the double clutch (16) in the flow of energy.

23. The dual clutch winding transmission according to claim 21, wherein the electric machine (41) is positioned between the double clutch (16) and an additional clutch (K0) which is located upstream from the double clutch (16) in the flow of energy.

24. The dual clutch winding transmission according to claim 21, wherein the dual clutch winding transmission further comprises an electric machine (42) which is located on an additional counter shaft (43) that is either on a drive input side or an output side of the dual clutch winding transmission and is linked with either the first or the second sub-transmission (T1, T2).

25. The dual clutch winding transmission according to claim 1, wherein a plurality of shift clutches, which are either shift clusters (A/B, C/D) or single shift elements (A, B, C, D), are associated with gear shift positions of the first winding sub-transmission (T1), and a plurality of shift clutches, which are single shift elements (E, F, G, H), are associated with gear shift positions of the second winding sub-transmission (T2) which is positioned on an output side of the dual clutch winding transmission.

26. The dual clutch winding transmission according to claim 25, wherein active coupling devices (23, 24) prevent simultaneous shifting of the single shift elements (A, B, C, D, E, F, G, H), that are positioned opposite of the counter shafts (2, 22) on the transmission inputs shafts (1, 19, 20) and the transmission output shaft (15).

27. The dual clutch winding transmission according to claim 26, wherein a first coupling device (23) is a mechanical coupling that is transversely movable between either outer walls of associated identical sliding sleeves or a synchronization sleeve (25) of the shift clutches positioned opposite therefrom.

28. The dual clutch winding transmission according to claim 26, wherein a second coupling device (24) is a mechanical coupling that is laterally rotatable between axially opposite, outer walls of sliding sleeves or synchronization sliding sleeves (25) of opposite shift clutches and any randomly specified gear shift position of the second sub-transmission (T2), positioned on the output side is a direct gear position.

29. A double clutch winding transmission comprising:
first and second sub-transmissions (T1, T2), a double clutch (K1, K2), at least one counter shaft (2, 22) and a transmission output shaft (15);
the first sub-transmission (T1) having a transmission input shaft (19) that is coaxially aligned with a transmission input shaft (1) of the second sub-transmission (T2) and the transmission output shaft (15);
the transmission input shafts (1, 19) of the first and second sub-transmissions (T1, T2) each being respectively coupled to the double clutch (K1, K2), such that a flow of energy (L1, L2, L3, L4, L5, L6, L7, L8) of at least one gear shift position is passed through at least one pair of meshing gear wheels (3, 4, 5, 6, 7, 8, 9, 10, 11, 12, 13, 14);
each pair of meshing gear wheels forming a gearwheel plane (Z1, Z2, Z3, Z4, Z5, Z6);
the first and the second sub-transmissions (T1, T2) respectively being a first and second single winding transmissions (W1, W2) which are positioned, one sequentially behind an another, in the double clutch winding transmission;
each of the first and the second single winding transmissions (W1, W2) comprising at least four forward gear shift positions; and
both the first and the second sub-transmissions (T1, T2) each comprising only three gear wheel planes (Z1, Z2, Z3 and Z4, Z5, Z6).

* * * * *